US012404357B2

(12) United States Patent
Yu et al.

(10) Patent No.: US 12,404,357 B2
(45) Date of Patent: Sep. 2, 2025

(54) DUAL METALLOCENE BIMODAL HDPE RESINS WITH IMPROVED STRESS CRACK RESISTANCE

(71) Applicant: Chevron Phillips Chemical Company LP, The Woodlands, TX (US)

(72) Inventors: Youlu Yu, Bartlesville, OK (US); Qing Yang, Bartlesville, OK (US); Ashish M. Sukhadia, Bartlesville, OK (US); David A Soules, Bartlesville, OK (US); Jeremy M. Praetorius, Bartlesville, OK (US); Vivek Rohatgi, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 681 days.

(21) Appl. No.: 17/575,715

(22) Filed: Jan. 14, 2022

(65) Prior Publication Data
US 2023/0227592 A1   Jul. 20, 2023

(51) Int. Cl.
  *C08F 210/16*   (2006.01)
  *C08F 10/02*    (2006.01)
  (Continued)

(52) U.S. Cl.
  CPC .......... *C08F 210/16* (2013.01); *C08F 10/02* (2013.01); *C08F 110/02* (2013.01);
  (Continued)

(58) Field of Classification Search
  CPC .... C08F 210/16; C08F 210/18; C08F 210/02; C08F 110/02; C08F 10/02
  See application file for complete search history.

(56) References Cited

U.S. PATENT DOCUMENTS

| 3,242,099 A | 3/1966 | Manyik |
| 3,248,179 A | 4/1966 | Norwood |

(Continued)

FOREIGN PATENT DOCUMENTS

WO   2014120540 A1   8/2014

OTHER PUBLICATIONS

International Search Report and Written Opinion issued in corresponding PCT Application No. PCT/US2022/081403, mailed on May 31, 2023, 14 pp.

(Continued)

*Primary Examiner* — Ling Siu Choi
*Assistant Examiner* — David L Miller
(74) *Attorney, Agent, or Firm* — Merchant & Gould P.C.

(57) ABSTRACT

Ethylene-based polymers having a density from 0.94 to 0.96 g/cm$^3$, a Mn from 5,000 to 14,000 g/mol, a ratio of Mw/Mn from 18 to 40, and at least one of a PENT value at 2.4 MPa of at least 11,500 hr and/or a W90 from 7.5 to 15 wt. % are disclosed. Additional ethylene polymers can have the same density, Mn, and Mw/Mn values, as well as a relaxation time from 0.5 to 3.5 sec, a CY-a parameter from 0.48 to 0.68, a HLMI from 5 to 11 g/10 min, a viscosity at HLMI from 3,000 to 7,500 Pa-sec, and a higher molecular weight component (HMW) and a lower molecular weight (LMW) component, in which a ratio of the number of SCBs at Mp of the HMW component to the number of SCBs at Mp of the LMW component is from 3.5 to 8.

30 Claims, 6 Drawing Sheets

(51) Int. Cl.
*C08F 110/02* (2006.01)
*C08F 210/02* (2006.01)
*C08F 210/18* (2006.01)

(52) U.S. Cl.
CPC .......... *C08F 210/02* (2013.01); *C08F 210/18* (2013.01); *C08F 2420/00* (2013.01)

(56) References Cited

U.S. PATENT DOCUMENTS

| | | | |
|---|---|---|---|
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 4,937,299 A * | 6/1990 | Ewen | C08L 23/0815 |
| | | | 525/240 |
| 5,352,749 A | 10/1994 | Dechellis | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,807,938 A | 9/1998 | Kaneko | |
| 5,919,983 A | 7/1999 | Rosen | |
| 6,107,230 A | 8/2000 | McDaniel | |
| 6,165,929 A | 12/2000 | McDaniel | |
| 6,239,235 B1 | 5/2001 | Hottovy | |
| 6,262,191 B1 | 7/2001 | Hottovy | |
| 6,294,494 B1 | 9/2001 | McDaniel | |
| 6,300,271 B1 | 10/2001 | McDaniel | |
| 6,316,553 B1 | 11/2001 | McDaniel | |
| 6,355,594 B1 | 3/2002 | McDaniel | |
| 6,376,415 B1 | 4/2002 | McDaniel | |
| 6,388,017 B1 | 5/2002 | McDaniel | |
| 6,391,816 B1 | 5/2002 | McDaniel | |
| 6,395,666 B1 | 5/2002 | McDaniel | |
| 6,524,987 B1 | 2/2003 | Collins | |
| 6,548,442 B1 | 4/2003 | McDaniel | |
| 6,576,583 B1 | 6/2003 | McDaniel | |
| 6,613,712 B1 | 9/2003 | McDaniel | |
| 6,632,894 B1 | 10/2003 | McDaniel | |
| 6,667,274 B1 | 12/2003 | Hawley | |
| 6,750,302 B1 | 6/2004 | McDaniel | |
| 6,833,415 B2 | 12/2004 | Kendrick | |
| 7,026,494 B1 | 4/2006 | Yang | |
| 7,041,617 B2 | 5/2006 | Jensen | |
| 7,199,073 B2 | 4/2007 | Martin | |
| 7,226,886 B2 | 6/2007 | Jayaratne | |
| 7,294,599 B2 | 11/2007 | Jensen | |
| 7,312,283 B2 | 12/2007 | Martin | |
| 7,517,939 B2 | 4/2009 | Yang | |
| 7,531,606 B2 | 5/2009 | Hendrickson | |
| 7,598,327 B2 | 10/2009 | Shaw | |
| 7,601,665 B2 | 10/2009 | McDaniel | |
| 7,619,047 B2 | 11/2009 | Yang | |
| 7,884,163 B2 | 2/2011 | McDaniel | |
| 8,114,946 B2 | 2/2012 | Yang | |
| 8,309,485 B2 | 11/2012 | Yang | |
| 8,383,754 B2 | 2/2013 | Yang | |
| 8,623,973 B1 | 1/2014 | McDaniel | |
| 8,722,416 B2 | 5/2014 | Yu et al. | |
| 8,822,608 B1 | 9/2014 | Bhandarkar | |
| 9,023,959 B2 | 5/2015 | McDaniel | |
| 9,758,600 B1 | 9/2017 | Praetorius | |
| 2007/0197374 A1 | 8/2007 | Yang et al. | |
| 2009/0246433 A1 | 10/2009 | Michie | |
| 2009/0246443 A1 * | 10/2009 | Akiba | G11B 7/245 |
| | | | 428/64.4 |
| 2014/0024789 A1 * | 1/2014 | Ker | C08F 210/16 |
| | | | 526/113 |

OTHER PUBLICATIONS

Hieber et al., entitled "Shear-Rate-Dependence Modeling of Polymer Melt Viscosity," Polymer Engineering and Science, 1992, 32(14), pp. 931-938.
Hieber et al., entitled "Some correlations involving the shear viscosity of polystyrene melts," Rheologica Acta, 1989, vol. 28, pp. 321-332.
IUPAC Compendium of Chemical Terminology, 2nd Ed. 1997, pp. 1-1670.
Janzen, et al., "Diagnosing Long-Chain Branching in Polyethylene," Journal of Mol. Struct., 485/486, 1999, pp. 569-584.
Youlu Yu, et al., "Development of an Integrated On-Line 2D Analytical TREF-High Throughput SEC Technique for Polyolefins Characterization," Macromolecular Symposia, 2020, 390, 1900015, 12 pgs.
Partial Search Report issued in corresponding PCT Application No. PCT/US2022/081403, mailed on Apr. 5, 2023, 2 pp.

* cited by examiner

DUAL METALLOCENE BIMODAL HDPE RESINS WITH IMPROVED STRESS CRACK RESISTANCE

BACKGROUND OF THE INVENTION

Polyolefins such as high density polyethylene (HDPE) homopolymer and copolymer and linear low density polyethylene (LLDPE) copolymer can be produced using various combinations of catalyst systems and polymerization processes. Chromium-based catalyst systems can, for example, produce ethylene-based polymers having good extrusion processability and polymer melt strength, typically due to their broad molecular weight distribution (MWD).

In some end-uses, such as pipe and blow molding applications, it can be beneficial to have similar density, molecular weight, and MWD properties as that of an ethylene polymer produced using a chromium-based catalyst system, but with improvements in stress crack resistance (e.g., Pennsylvania Edge Notch Tensile, PENT). Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Disclosed herein are high density ethylene-based polymers having excellent stress crack resistance. In an aspect, the ethylene polymer can have (or can be characterized by) a density in a range from 0.94 to 0.96 g/cm$^3$, a Mn in a range from 5,000 to 14,000 g/mol, a ratio of Mw/Mn in a range from 18 to 40, and a PENT value at 2.4 MPa of at least 11,500 hr. In another aspect, the ethylene polymer can have (or can be characterized by) a density in a range from 0.94 to 0.96 g/cm$^3$, a Mn in a range from 5,000 to 14,000 g/mol, a ratio of Mw/Mn in a range from 18 to 40, and a W90 (or Wh) in a range from 7.5 to 15 wt. %. In yet another aspect, the ethylene polymer can have (or can be characterized by) a density in a range from 0.94 to 0.96 g/cm$^3$, a Mn in a range from 5,000 to 14,000 g/mol, a ratio of Mw/Mn in a range from 18 to 40, a relaxation time in a range from 0.5 to 3.5 sec, a CY-a parameter in a range from 0.48 to 0.68, a high load melt index (HLMI) in a range from 5 to 11 g/10 min, a viscosity at HLMI in a range from 3,000 to 7,500 Pa-sec, and a higher molecular weight component (HMW) and a lower molecular weight (LMW) component, wherein a ratio of a number of SCBs per 1000 total carbon atoms at Mp of the HMW component to a number of SCBs per 1000 total carbon atoms at Mp of the LMW component is in a range from 3.5 to 8.

These ethylene polymers can be used to produce various articles of manufacture, such as pipes and blow molded bottles.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
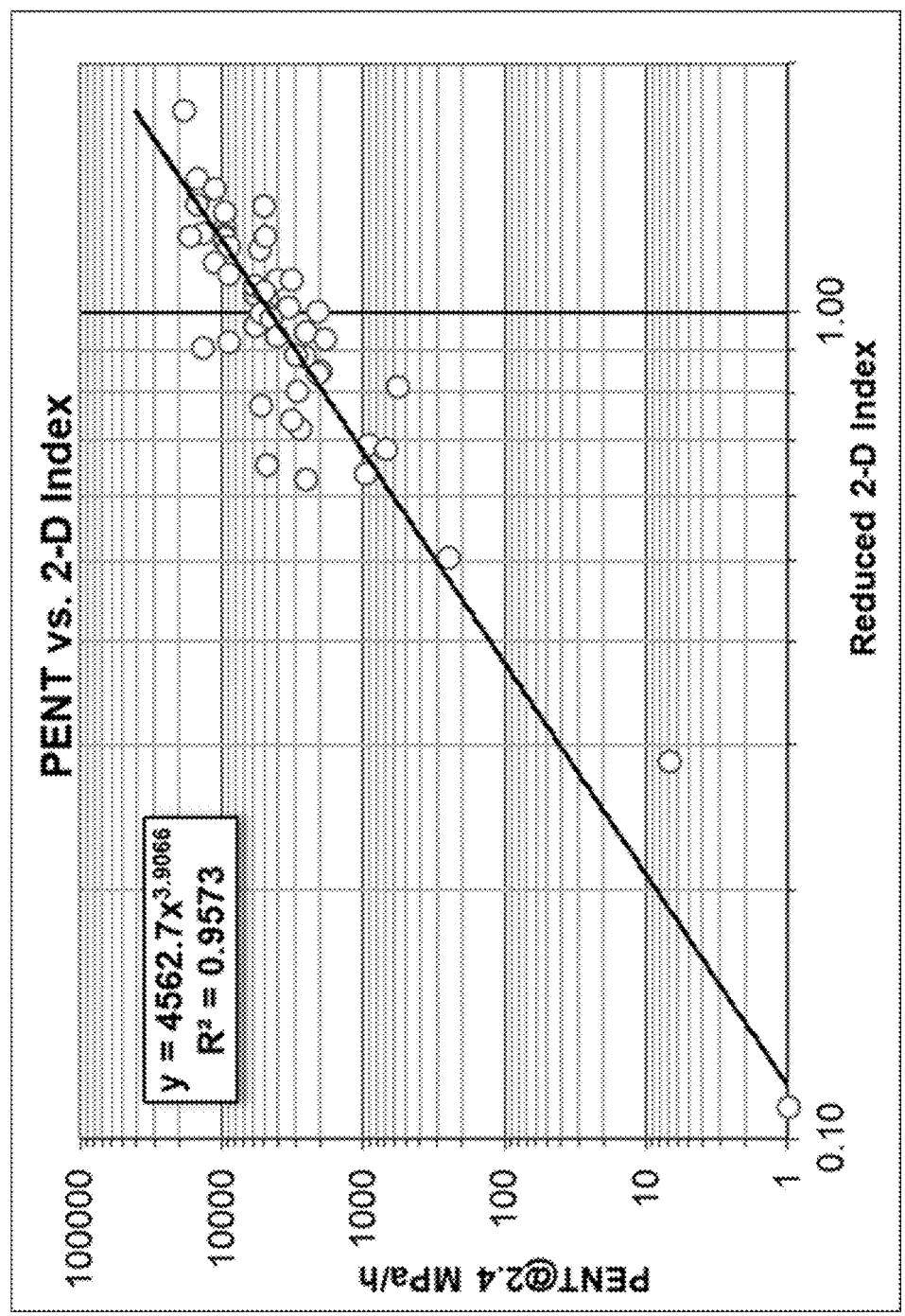
FIG. 1 presents a plot of PENT values versus R2DI for a large set of ethylene polymers produced using different catalyst systems.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the polymer compositions and/or methods described herein are contemplated with or without explicit description of the particular combination. Additionally, unless explicitly recited otherwise, any aspect and/or feature disclosed herein can be combined to describe inventive features consistent with the present disclosure.

While polymer compositions and methods are described herein in terms of "comprising" various components or steps, the compositions and methods also can "consist essentially of" or "consist of" the various components or steps, unless stated otherwise. The terms "a," "an," "the," etc., are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers.

Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, catalyst component I, catalyst component II, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the ethylene polymer can have various ratios of Mw/Mn in aspects of this invention. By a disclosure that the ratio of Mw/Mn is in a range from 18 to 40, the intent is to recite that the ratio of Mw/Mn can be any ratio in the range and, for example, can include any range or combination of ranges from 18 to 40, such as from 18 to 38, from 20 to 40, from 20 to 38, from 20 to 35, or from 22 to 34, and so forth. Likewise, all other ranges disclosed herein should be interpreted in a manner similar to this example.

In general, an amount, size, formulation, parameter, range, or other quantity or characteristic is "about" or "approximately" whether or not expressly stated to be such. Whether or not modified by the term "about" or "approximately," the claims include equivalents to the quantities or characteristics.

DETAILED DESCRIPTION OF THE INVENTION

The present invention is directed generally to dual metallocene catalyst systems, methods for using the catalyst systems to polymerize olefins, the polymer resins produced using such catalyst systems, and blow molded and pipe products and other articles of manufactures produced using these polymer resins. In particular, the present invention relates to metallocene-based bimodal ethylene polymers having excellent stress crack resistance, as quantified by PENT values at 2.4 MPa (ASTM F1473), and to methods for predicting PENT values using a semi-empirical model.

Long term physical properties for HDPE homopolymer and copolymer resins are critically important in pipes and other related end-use applications. In some instances, the PENT values—a measure of stress crack resistance—for certain end-uses must be at least 5,000 hr, in excess of 6 months. Clearly, testing PENT and other long-term performance attributes is very time-consuming. It takes thousands to tens of thousands of hours for a SCR test such as a PENT test to run to completion. Although other short-term testing and modeling techniques have been studied in the literature for rapid prediction of long-term SCR properties of HDPE resins, challenges and limitations still exist. It is desirable to have a model that uses experimental/analytical data to quickly predict the results of a lengthy PENT test, since PENT values of over 10,000 hr require over a year of testing via ASTM F1473.

While the inventive polymers disclosed herein have a combination of polymer properties that result in improvements in PENT, it would be beneficial to have a single metric from analytical testing of a small sample (e.g., less than a gram) that would directly correlate to PENT performance.

It has been theorized that increasing the probability of tie molecules (or tie chains) in pipe resins can result in improved stress crack resistance of the pipe resins. However, in addition to a suitable concentration of tie molecules, polymer processability cannot be negatively impacted. It is believed that one way to increase tie molecules is to selectively place short chain branches (SCBs) in the high molecular weight portion of the MWD, while minimizing SCB content in the LMW end. This can be accomplished by employing dual metallocene catalyst systems in which the metallocene component that produces the HMW component also has much higher comonomer incorporation efficiency than the metallocene compound that produces the LMW component.

Herein, a reduced 2D index (R2DI), which is derived from the data of a two-dimensional (2-D) analytical TREF-high throughput SEC (2D aTREF-hSEC) system using specific algorithms, is used to assess the tie molecule concentration and PENT performance of various bimodal ethylene-based polymer resins. Exceptionally high R2DI and ultra-high PENT values resulted in part due to increased populations with molecular weight (MWs) greater than M* eluting in the 80-90° C. range where additional effective tie molecules are present. The inventive polymers had much better PENT performance as compared to other polymers having generally the same Mw (weight-average molecular weight) and equivalent density.

The semi-empirical two-dimensional polymer compositional index (2DI) model herein correlates the 2DI to long-term polymer mechanical properties, such as PENT using 2D-SEC data experimentally determined via the a 2D aTREF-hSEC system, using three parameters determined in the 2D-SEC data set, namely elution temperature, $T_i$, the molecular weight, $M_j$, and the concentration, $dV_{i,j}$, per Equation 1:

$$dV_{i,j} = dT_i d(\text{Log } M)_j \left\{ \left(\frac{d\Omega}{dT}\right)_i \left(\frac{dw}{d(\text{Log } M)}\right)_j \right\} \quad \text{Eq. 1}$$

In Equation 1, $T_i$ and $$\left(\frac{d\Omega}{dT}\right)_i$$

are aTREF elution temperature and intensity of slice-i, respectively, and $dV_{i,j}$ is the weight fraction of a component eluting from $T_i$ to $T_{i+1}$ with a molecular weight from $M_j$ to $M_{j+1}$.

The contribution ($d\overline{\omega}_{i,j}$) of each component in the 2D aTREF-hSEC dataset to the SCR is shown in Equation 2:

$$(d\overline{\omega}_{i,j}) = K(\Delta T_E)_i^\varepsilon M_j^\alpha dV_{i,j} \qquad \text{Eq 2}$$

In Equation 2, K is a constant; $\Delta T_E$ is the difference between the elution temperature ($T_E^\circ$) of the perfect PE crystals at equilibrium and the actual elution temperature ($T_{E,i}$) of the i-th TREF slice—Equation 3:

$$\Delta T_{E,i} = T_E^o - T_{E,i} \qquad \text{Eq. 3}$$

In Equations 2 and 3, $\alpha$ is the power for the molecular weight ($M_j$). Its value is assigned to 0.5; and $\varepsilon$ is a "rewarding" factor that is empirically assigned to equal to 2. The increase of $\Delta T_s$ results in a decrease of crystal lamellar thickness. This in turn results in an increase of the probability for the coil to span over multiple long-period, $L_p$, thus an increase of tie molecule formation and the chain entanglements.

An integration of the differential 2DI over the entire elution temperature range and the molecular weight range starting from the critical molecular weight M* without the influence of amount of samples used in experimentation gives the 2D index, $\overline{\omega}$, for the full polymer, as shown in Equation 4:

$$\overline{\omega} = \frac{\left(K \int_{i=1}^{\infty} \int_{j>j^*}^{\infty} (\Delta T_E)_i^\varepsilon M_j^\alpha \left\{\left(\frac{d\Omega}{dT_E}\right)_i \left(\frac{dw}{d(\log M)}\right)_j\right\} dT_{E,i} d(\log M)_j\right)}{\left(\int_{i=1}^{\infty} \int_{j=1}^{\infty} \left\{\left(\frac{d\Omega}{dT_E}\right)_i \left(\frac{dw}{d(\log M)}\right)_j\right\} dT_{E,i} d(\log M)_j\right)} \qquad \text{Eq. 4}$$

Notice the integration in the numerator of Equation 4 does not start from j=1, but rather from j>j*, where when j≤j*, M≤M*. This means that no tie molecules will form if the diameter of the polymer coil whose molecular weight is equal to or less than the critical molecular weight, M*, is smaller than twice the crystal lamellar thickness ($L_c$) plus the thickness of the amorphous phase ($L_a$) that is sandwiched by the two adjacent lamellae. The critical molecular weight, M*, is calculated using Equation 5, in which D is a constant that equals to 6.8 for PE; n is the number of units in the polymer chain that equals $M/M_0$; and l is the length of the link that equals to 0.153 nm.

$$M^* = (2L_c + L_a)^2 M_0/Dl^2 \qquad \text{Eq. 5}$$

La is set at 15 nm while Lc is calculated using Thompson-Gibbs equation given by Equation 6:

$$L_c = \frac{0.626 T_m^o}{T_E^o - T_E} = \frac{0.626 T_m^o}{\Delta T_E} \qquad \text{Eq. 6}$$

To minimize this effect and to cancel out the constant K in Equation 4, a Ziegler-Natta bimodal HDPE control sample (H516) having a known PENT value near 5,000 hr is run under the same experimental conditions as the test sample in question (with unknown PENT). By comparing $\overline{\omega}$ of the sample in question, $\overline{\omega}_{unk}$, to that of the control resin, $\overline{\omega}_{Ctrl}$, a reduced 2DI parameter (R2DI), $\overline{\omega}_r$, is obtained using Equation 7, $$\overline{\omega}_r = \frac{\overline{\omega}_{unk}}{\overline{\omega}_{Ctrl}} \qquad \text{Eq. 7}$$

FIG. 1 illustrates the strong correlation between PENT values and R2DI for a large set of ethylene polymers produced using different catalyst systems. The data set reflected in FIG. 1 includes polymer resins ranging from Cr-based unimodal HDPE resins, Z-N bimodal HDPE resins, dual-metallocene bimodal resins made using various metallocene pairs supported on an activator-support, and a hybrid bimodal resin containing a LMW Z-N homopolymer and a HMW metallocene copolymer. It should be noted that some data points in FIG. 1 have a rather large deviation from the fitted line, and part of the reason for this is because non-brittle failure mechanism was involved in some of these data points as post-test examination of PENT specimens revealed the ductile failure zone. Further, the error bar of PENT failure time can be rather large depending on specimen preparation and notching. In addition, due to practical reasons such as when the minimum PENT requirement was met or the testing baths had to be freed up for other PENT samples, PENT tests had to be terminated early without letting the specimens fail naturally. In such cases, the PENT values were underestimated. In other cases, occasionally a high stress PENT test (3.8 MPa) had to be performed on samples expected to have very long PENT value in order to save testing time, and this accelerated PENT test was then converted to a normal PENT value (at 2.4 MPa) using an empirical equation, which could add uncertainty to the PENT values of these samples. Nonetheless, particular for the variety of polymer types tested, the relationship in FIG. 1 shows an excellent correlation between PENT values and R2DI. Using this PENT-R2DI relationship, in order to achieve a PENT in excess of 5,000 hr, the R2DI should be about 1.025 (logarithmic) to have a good statistical chance of having a PENT of at least 5,000 hr. Beneficially, to obtain the R2DI values generally takes less than 48 hr in analytical time and less than 1 gram (e.g., approximately ten milligrams) of sample.

The 2-D aTREF-hSEC system included an analytical TREF (aTREF) with high-throughput SEC (hSEC), and was used to obtain the two-dimensional polymer compositional data sets following procedures described in Y. Yu, M. H. Hildebrand, Development of an Integrated On-line Two-Dimensional Analytical TREF-High Throughput SEC Technique for Polyolefins Characterization, *Macromolecular Symposia*, 2020, 390, 1900015. Briefly, the aTREF unit employed a blow-air oven (Hewlett-Packard) that was capable of performing programmed-temperature increases and decreases at rates ranging from 0.1° C./min to 20° C./min. The aTREF column was a stainless-steel column with a dimension 25 mm (OD)×300 mm that was packed with 80 mesh glass beads, while the TREF pump was a Waters HPLC pump (Waters Inc., MA) with the capability to deliver a flowrate from 0.1 mL/min to up to 9.9 mL/min. The high-throughput SEC system was based on a PL-220 GPC/SEC system (Polymer Labs, an Agilent company) equipped with an HSPgel HT MB-H high-throughput column (Waters, MA) of a dimension of 6.0 mm (ID)×150 mm. With a modified plumbing system, this hSEC was equipped with a six-port injection valve and a differential refractive index (DRI) detector or IR4 detector for polymer concentration. The hSEC was generally run under the following conditions: injection volume, 100 uL; column temperature, 145° C.; flowrate, 0.6 mL/min; and a total run-time for each injection including all miscellaneous chromatographic times, 10 min. To calibrate the SEC column, Chevron Phillips Chemical Company LP Marlex® BHB5003 resin of a concentration of 1.5 mg/mL was eluted through the rapid GPC column under the same chromatographic conditions as for the aliquots of TREF eluent. The molecular weight averages and molecular weight distributions were then deduced via the integral method using a calibration curve generated from the chromatogram of Marlex® BHB5003.

As disclosed herein, very high PENT values correlate with an increased amount of the polymer with molecular weights greater than M* and, further, which elute in the 80-90° C. range. These polymer fractions can be quantified with W90, which is defined as the weight percentage of the polymer having molecular weights greater than M* (the critical MW) eluting at less than or equal to 90° C., excluding the non-crystallizable polymer fraction at 40° C. and below, and with Wh, which is defined as the weight percentage of the polymer having molecular weights greater than M* eluting at a temperature in a range from 80° C. to 90° C. The W90 and Wh values of individual polymers are provided further hereinbelow.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof; or alternatively, the comonomer can comprise 1-hexene. Typically, the amount of the comonomer, based on the total weight of monomer (ethylene) and comonomer, can be in a range from 0.01 to 20 wt. %, from 0.01 to 1 wt. %, from 0.5 to 15 wt. %, from 0.5 to 8 wt. %, or from 1 to 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof, or alternatively, an ethylene/1-hexene copolymer.

An illustrative and non-limiting example of a first ethylene polymer (e.g., comprising an ethylene copolymer) consistent with the present invention can have (or can be characterized by) a density in a range from 0.94 to 0.96 g/cm³, a Mn in a range from 5,000 to 14,000 g/mol, a ratio of Mw/Mn in a range from 18 to 40, and a PENT value at 2.4 MPa of at least 11,500 hr (per ASTM F1473). In some instances, the PENT value can be at least 12,000 hr, at least 13,000 hr, at least 14,000 hr, or at least 15,000 hr. The PENT test is typically stopped after a certain number of hours is reached, and given the long duration of the test, the upper limit of PENT (in hours) is generally not determined. The high load melt index (HLMI) of the first ethylene polymer, in some aspects, can be in a range from 1 to 25 g/10 min, from 2 to 20 g/10 min, from 3 to 15 g/10 min, from 4 to 14 g/10 min, from 5 to 11 g/10 min, or from 5 to 10 g/10 min. Additionally or alternatively, the first ethylene polymer can have a W90 (and/or Wh) in a range from 3 to 15 wt. %, from 5 to 15 wt. %, or from 7.5 to 15 wt. %.

An illustrative and non-limiting example of a second ethylene polymer consistent with the present invention can have (or can be characterized by) a density in a range from 0.94 to 0.96 g/cm³, a Mn in a range from 5,000 to 14,000 g/mol, a ratio of Mw/Mn in a range from 18 to 40, and a W90 (and/or Wh) in a range from 7.5 to 15 wt. %. In some instances, the second ethylene polymer can have a W90 (and/or Wh) in a range from 7.5 to 14 wt. %, from 7.5 to 13 wt. %, or from 8 to 14 wt. %. The high load melt index (HLMI) of the second ethylene polymer, in some aspects, can be in a range from 1 to 25 g/10 min, from 2 to 20 g/10 min, from 3 to 15 g/10 min, from 4 to 14 g/10 min, from 5 to 11 g/10 min, or from 5 to 10 g/10 min. Additionally or alternatively, the second ethylene polymer can have a PENT value at 2.4 MPa (ASTM F1473) of at least 5,000 hr, at least 7,500 hr, at least 10,000 hr, at least 11,500 hr, or at least 13,000 hr.

An illustrative and non-limiting example of a third ethylene polymer consistent with the present invention can have (or can be characterized by) a density in a range from 0.94 to 0.96 g/cm³, a Mn in a range from 5,000 to 14,000 g/mol, a ratio of Mw/Mn in a range from 18 to 40, a relaxation time in a range from 0.5 to 3.5 sec, a CY-a parameter in a range from 0.48 to 0.68, a high load melt index (HLMI) in a range from 5 to 11 g/10 min, a viscosity at HLMI in a range from 3,000 to 7,500 Pa-sec, and a higher molecular weight component (HMW) and a lower molecular weight (LMW) component, wherein a ratio of a number of SCBs per 1000 total carbon atoms at Mp of the HMW component to a number of SCBs per 1000 total carbon atoms at Mp of the LMW component is in a range from 3.5 to 8. The HLMI of the third ethylene polymer, in some aspects, can be in a range from 5 to 10 g/10 min, from 6 to 11 g/10 min, or from 6 to 10 g/10 min. Likewise, in some aspects, the third ethylene polymer can have a PENT value at 2.4 MPa (ASTM F1473) of at least 5,000 hr, at least 7,500 hr, at least 10,000 hr, at least 11,500 hr, or at least 13,000 hr. Additionally or alternatively, the third ethylene polymer can have a W90 (and/or Wh) in a range from 3 to 15 wt. %, from 5 to 15 wt. %, or from 7.5 to 15 wt. %.

These illustrative and non-limiting examples of the first ethylene polymer, the second ethylene polymer, and the third ethylene polymers consistent with the present invention also can have any of the polymer properties listed below and in any combination, unless indicated otherwise.

The densities of these ethylene-based polymers often are greater than or equal to 0.94 g/cm$^3$, for example, greater than or equal to 0.942 g/cm$^3$, or greater than or equal to 0.945 g/cm$^3$. Yet, in particular aspects, the density can be in a range from 0.94 to 0.958 g/cm$^3$, from 0.942 to 0.96 g/cm$^3$, from 0.942 to 0.958 g/cm$^3$, or from 0.945 to 0.958 g/cm$^3$.

In an aspect, the ethylene polymers can have a number-average molecular weight (Mn) in a range from 5,000 to 14,000 g/mol, such as from 5,000 to 13,000 g/mol, from 5,000 to 12,000 g/mol, from 6,000 to 14,000 g/mol, or from 6,000 to 12,000 g/mol, and the like. Additionally or alternatively, the ethylene polymers can have a ratio of Mw/Mn, or the polydispersity index, in a range from 18 to 40, such as from 18 to 38, from 20 to 40, from 20 to 38, from 20 to 35, or from 22 to 34, and the like.

While not limited thereto, the first ethylene polymer, the second ethylene polymer, and the third ethylene polymer, independently, can have a Mw in a range from 175,000 to 350,000 g/mol, from 200,000 to 325,000 g/mol, from 200,000 to 300,000 g/mol, or from 225,000 to 300,000 g/mol. Additionally or alternatively, these ethylene polymers can have a z-average molecular weight (Mz) in a range from 700,000 to 2,000,000 g/mol, from 700,000 to 1,700,000 g/mol, from 750,000 to 1,500,000 g/mol, from 850,000 to 1,400,000 g/mol, or from 900,000 to 1,350,000 g/mol. Additionally or alternatively, these ethylene polymers can have a ratio of Mz/Mw in a range from 2.5 to 8, from 3 to 8, from 3 to 7, from 3 to 6, from 3.5 to 6, from 3.5 to 5.5, or from 3.5 to 5.

In accordance with certain aspects of this invention, the IB parameter from a molecular weight distribution curve (plot of dW/d(Log M) vs. Log M; normalized to an area equal to 1) can be an important characteristic of the ethylene polymers described herein. The IB parameter is often referred to as the integral breadth, and is defined as $1/[dW/d(Log\ M)]_{MAX}$, and is useful to describe the shape of the largest peak in a bimodal MWD: the largest peak is smaller/broader as the IB parameter increases. Generally, the IB parameter of the ethylene polymers consistent with this invention can, in one aspect, be in a range from 1.8 to 2.3. In another aspect, the ethylene polymer can be characterized by an IB parameter in a range from 1.85 to 2.25, and in yet another, the IB parameter can range from 1.9 to 2.2, and in still another aspect, the IB parameter can range from 1.95 to 2.15.

Ethylene polymers consistent with certain aspects of the invention can have a bimodal molecular weight distribution (as determined using gel permeation chromatography (GPC) or other related analytical technique). Often, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754.

Thus, in aspects of this invention, the ethylene polymer can comprise a high or higher molecular weight (HMW) component (or a first component) and a low or lower molecular weight (LMW) component (or a second component). These component terms are relative, are used in reference to each other, and are not limited to the actual molecular weights of the respective components. The molecular weight characteristics of these LMW and HMW components can be determined by deconvoluting the composite (overall polymer) molecular weight distribution (e.g., determined using gel permeation chromatography). While not limited thereto, the Mp (LMW) of the ethylene polymer can range from 10,000 to 30,000 g/mol, such as from 12,000 to 26,000 g/mol, from 15,000 to 24,000 g/mol, or from 16,000 to 22,000 g/mol, and the like. Additionally or alternatively, the Mp (HMW) of the ethylene polymer can range from 400,000 to 600,000 g/mol, such as from 410,000 to 560,000 g/mol, from 420,000 to 550,000 g/mol, or from 430,000 to 540,000 g/mol, and the like.

Unexpectedly, the amount of short chain branches (SCBs) in the HMW component is much greater than the amount of SCBs in the LMW component. For instance, the ratio of the number of SCBs per 1000 total carbon atoms at Mp of the HMW component to the number of SCBs per 1000 total carbon atoms at Mp of the LMW component can range from as low as 3.5 to as high as 8. Typical ranges for this ratio, therefore, can include from 3.5 to 8, from 3.5 to 7, from 3.5 to 6.5, from 4 to 7, from 4 to 6.5, or from 4.3 to 6, and the like.

In an aspect, these ethylene polymers can have a CY-a parameter in a range from 0.48 to 0.68. Other suitable ranges for the CY-a parameter include, but are not limited to, from 0.48 to 0.65, from 0.48 to 0.61, from 0.5 to 0.68, from 0.5 to 0.65, from 0.52 to 0.63, or from 0.55 to 0.61, and the like. Additionally or alternatively, these ethylene polymers can have a relaxation time (Tau(eta) or $\tau(\eta)$) in a range from 0.5 to 3.5 sec. Other suitable ranges for the relaxation time include, but are not limited to, from 0.5 to 3 sec, from 0.5 to 2.5 sec, from 1 to 3 sec, or from 1 to 2 sec. A polymer relaxation time typically refers to the time it takes the polymer chains to return to equilibrium after being disturbed. Non-Newtonian fluids have a characteristic memory time scale which is referred to as the relaxation time. When the applied rate of deformation is reduced to zero, these materials relax over their characteristic relaxation time. A low Tau(eta) value is desirable because it corresponds to minimized stresses in the polymer during orientation such as in a molding process. Generally, Tau(eta) increases with molecular weight, however, the entanglements of the polymer, the long chain branching, the molecular weight, and the molecular weight distribution all influence the relaxation behavior. Additionally or alternatively, these ethylene polymers can be characterized by a viscosity at HLMI (eta @ HLMI or 11 @ HLMI) at 190° C. in a range from 3,000 to 7,500 Pa-sec. Other suitable ranges for the viscosity at HLMI include, but are not limited to, from 3,000 to 7,200, from 3,000 to 7,000, from 3,500 to 7,000, from 3,500 to 6,500, from 4,000 to 7,000, from 4,000 to 6,500, or from 4,300 to 6,500 Pa-sec, and the like. The CY-a and relaxation time parameters are determined from viscosity data measured at 190° C. and using the Carreau-Yasuda (CY) empirical model described herein.

While not limited thereto, the first ethylene polymer, the second ethylene polymer, and the third ethylene polymer, independently, can have a tan δ (tan d or tangent delta) at 0.1 sec$^{-1}$ in a range from 2.2 to 3.9 degrees and/or a viscosity at 100 sec$^{-1}$ (eta @ 100 or $\eta$ @ 100) at 190° C. in a range from 2,200 to 2,800 Pa-sec. Other suitable ranges for the tan δ at 0.1 sec$^{-1}$ include, but are not limited to, from 2.3 to 3.8 degrees, from 2.4 to 3.7 degrees, from 2.5 to 3.6 degrees, or from 2.6 to 3.5 degrees, and the like. The (low frequency) tan δ at 0.1 sec$^{-1}$ of greater than 1, as opposed to less than 1, is indicative of a polymer with relatively low elasticity at low shear, which can be beneficial for certain blow molding applications. Other suitable ranges for the viscosity at 100 sec$^{-1}$ include, but are not limited to, from 2,250 to 2,750, from 2,300 to 2,700, from 2,350 to 2,650, or from 2,400 to 2,600 Pa-sec, and the like. Additionally or alternatively, these ethylene polymers can have a ratio of η @ 0.1/η @ 100 at 190° C. in a range from 20 to 80; alternatively, from 25 to 75; alternatively, from 25 to 70; alternatively, from 30 to 60; alternatively, from 33 to 55; or alternatively, from 36 to 52. The tan δ rheological parameter is determined from viscosity data measured at 190° C. and using the Carreau-Yasuda (CY) empirical model described herein.

Generally, ethylene polymers in aspects of the present invention are essentially linear or have very low levels of long chain branching, with typically less than 5 long chain branches (LCBs) per 1,000,000 total carbon atoms—using the Janzen-Colby model described herein. In some aspects, the first ethylene polymer, the second ethylene polymer, and the third ethylene polymer, independently, can contain from 0.5 to 5 LCBs, from 1 to 4 LCBs, from 1.4 to 3 LCBs, from 1.4 to 2.5 LCBs, from 1.45 to 2.25 LCBs, from 1.45 to 2.05 LCBs, or from 1.5 to 2 LCBs, per 1,000,000 total carbon atoms.

In some aspects, the ethylene polymers can be characterized by a reverse comonomer distribution, generally, the higher molecular weight components of the polymer have higher comonomer incorporation than the lower molecular weight components. Typically, there is increasing comonomer incorporation with increasing molecular weight. In one aspect, the number of short chain branches (SCBs) per 1000 total carbon atoms of the polymer can be greater at Mw than at Mn. In another aspect, the number of SCBs per 1000 total carbon atoms of the polymer can be greater at Mz than at Mw. In yet another aspect, the number of SCBs per 1000 total carbon atoms of the polymer can be greater at Mz than at Mn.

In an aspect, the ethylene polymers described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Moreover, the ethylene polymers can be produced with dual metallocene catalyst systems containing zirconium and/or hafnium, discussed further below. Ziegler-Natta and chromium based catalysts systems are not required. Therefore, the ethylene polymer can contain no measurable amount of Mg, V, Ti, and/or Cr (catalyst residue), i.e., less than 0.1 ppm by weight. In some aspects, the first ethylene polymer, the second ethylene polymer, and the third ethylene polymer can contain, independently, less than 0.08 ppm, less than 0.05 ppm, or less than 0.03 ppm, of Mg, V, Ti, and/or Cr.

These ethylene polymers can further contain any suitable additive or combination of additives. For instance, typical additives include antioxidants, acid scavengers, antiblock additives, slip additives, colorants, fillers, processing aids, UV additives, and the like, as well as combinations thereof.

Articles and Products

Articles of manufacture can be formed from, and/or can comprise, the ethylene polymers of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, *film extrusion*, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992. In some aspects of this invention, an article of manufacture can comprise any of the ethylene polymers described herein, and the article of manufacture can be or can comprise a pipe or a blow molded product, such as a blow molded bottle.

Catalyst Systems and Polymerization Processes

In accordance with aspects of the present invention, the ethylene polymer can be produced using a dual catalyst system. In these aspects, catalyst component I can comprise any suitable unbridged metallocene compound disclosed herein, and catalyst component II can comprise any suitable bridged metallocene compound disclosed herein. The catalyst system also can comprise any suitable activator or any activator disclosed herein, and optionally, any suitable co-catalyst or any co-catalyst disclosed herein.

Referring first to catalyst component I, which can comprise an unbridged zirconium or hafnium based metallocene compound containing two cyclopentadienyl groups, two indenyl groups, or a cyclopentadienyl and an indenyl group. In one aspect, catalyst component I can comprise an unbridged zirconium or hafnium based metallocene compound containing two cyclopentadienyl groups. In another aspect, catalyst component I can comprise an unbridged zirconium or hafnium based metallocene compound containing two indenyl groups. In yet another aspect, catalyst component I can comprise an unbridged zirconium or hafnium based metallocene compound containing a cyclopentadienyl group and an indenyl group.

Catalyst component I can comprise, in particular aspects of this invention, an unbridged metallocene compound having formula (I):

Within formula (I), M, Cp$^A$, Cp$^B$, and each X are independent elements of the unbridged metallocene compound. Accordingly, the unbridged metallocene compound having formula (I) can be described using any combination of M, Cp$^A$, Cp$^B$, and X disclosed herein. Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Zr or Hf Thus, M can be Zr in one aspect, and M can be Hf in another aspect. Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand. Suitable hydrocarbyl groups, hydrocarboxy groups, hydrocarbylaminyl groups, hydrocarbylsilyl groups, and hydrocarbylaminylsilyl groups are disclosed, for example, in U.S. Pat. No. 9,758,600.

Generally, the hydrocarbyl group which can be an X in formula (I) can be a $C_1$ to $C_{36}$ hydrocarbyl group, including a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

In particular aspects of this invention, each X independently can be a halide or a $C_1$ to $C_{18}$ hydrocarbyl group. For instance, each X can be $C_1$.

In formula (I), $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, or two substituents, or three substituents, or four substituents, and so forth.

Suitable hydrocarbyl groups, halogenated hydrocarbyl groups, hydrocarboxy groups, and hydrocarbylsilyl groups that can be substituents are disclosed, for example, in U.S. Pat. No. 9,758,600. For instance, the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

Illustrative and non-limiting examples of unbridged metallocene compounds having formula (I) and/or suitable for use as catalyst component I can include the following compounds (Ph=phenyl):

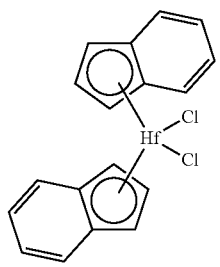

(1)

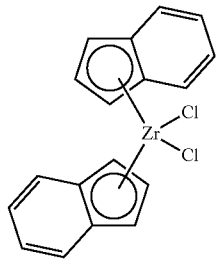

(2)

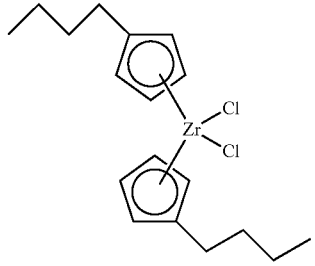

(3)

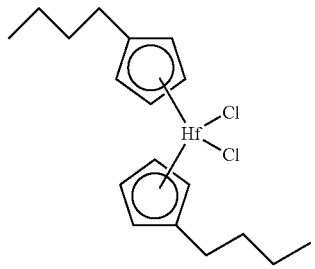

(4)

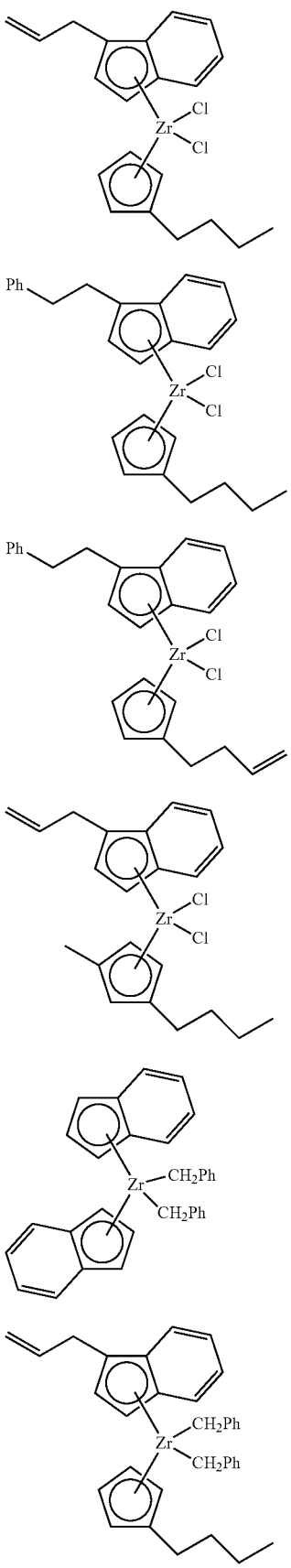

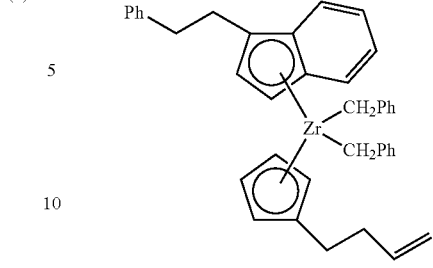

and the like, as well as combinations thereof.

Catalyst component I is not limited solely to unbridged metallocene compounds such as described above. Other suitable unbridged metallocene compounds are disclosed in U.S. Pat. Nos. 7,199,073, 7,226,886, 7,312,283, and 7,619,047.

Referring now to catalyst component II, which can be a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group. Further, catalyst component II can comprise a bridged metallocene compound having an aryl group substituent on the bridging group.

Catalyst component II can comprise, in particular aspects of this invention, a bridged metallocene compound having formula (II):

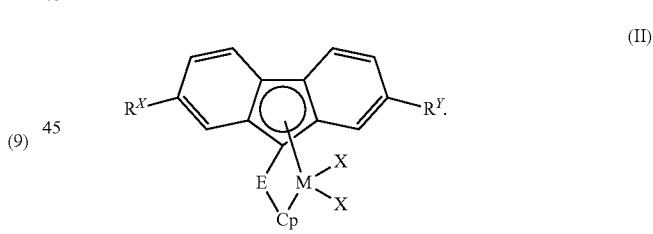

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein. The selections for M and each X in formula (II) are the same as those described herein above for formula (I). In formula (II), Cp can be a substituted cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, or two substituents, or three substituents, or four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to Cm hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be a bridging group having the formula $>E^A R^A R^B$, wherein $E^A$ can be C, Si, or Ge, and $R^A$ and $R^B$ independently can be H or a $C_1$ to Cis hydrocarbyl group. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

Illustrative and non-limiting examples of bridged metallocene compounds having formula (II) and/or suitable for use as catalyst component II can include the following compounds (Me=methyl; Ph=phenyl; t-Bu=tert-butyl):

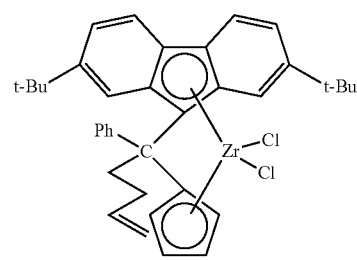

(14)

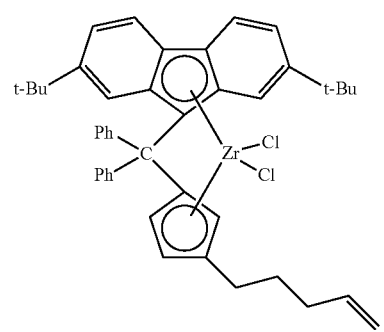

(15)

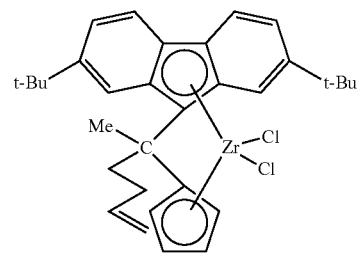

(16)

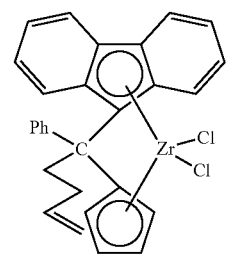

(17)

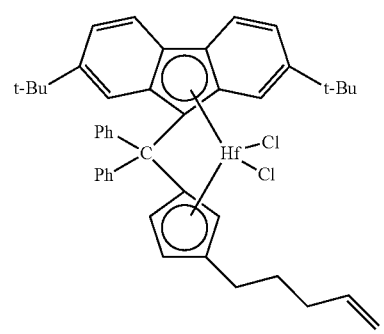

(18)

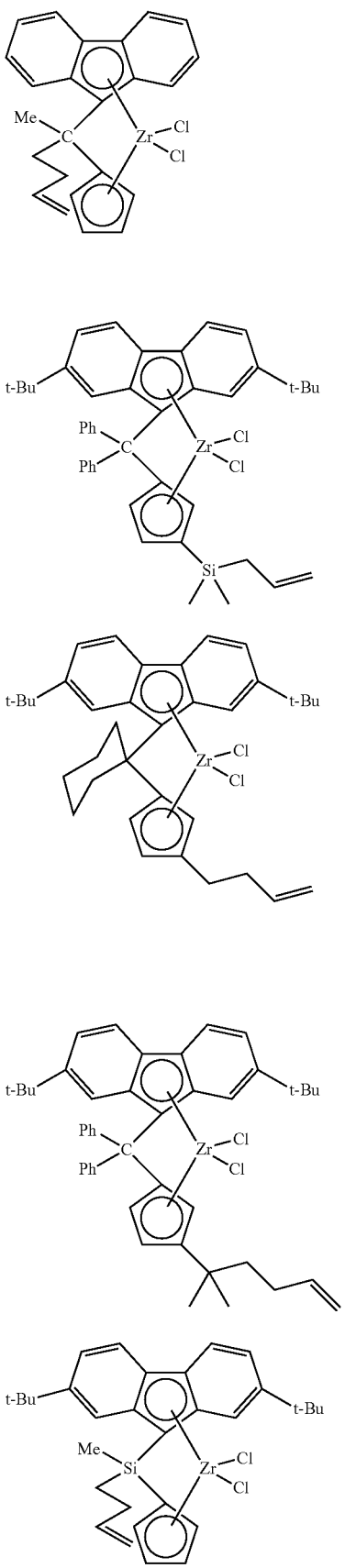

(19)

(20)

(21)

(22)

(23)

(24)

(25)

and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047.

According to an aspect of this invention, the weight ratio of catalyst component I to catalyst component II in the catalyst composition can be in a range from 10:1 to 1:10, from 8:1 to 1:8, from 5:1 to 1:5, from 4:1 to 1:4, from 3:1 to 1:3; from 2:1 to 1:2, from 1.5:1 to 1:1.5, from 1.25:1 to 1:1.25, or from 1.1:1 to 1:1.1.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485. Other suitable processes and procedures for preparing activator-supports (e.g., fluorided solid oxides and sulfated solid oxides) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl) zinc, di(triethylsilyl) zinc, di(triisoproplysilyl) zinc, di(triphenylsilyl) zinc, di(allyldimethylsilyl) zinc, di(trimethylsilylmethyl) zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than 250 grams of ethylene polymer (homopolymer and/or copolymer, as the context requires) per gram of activator-support per hour (abbreviated g/g/hr). In another aspect, the catalyst activity can be greater than 350, greater than 450, or greater than 550 g/g/hr. Yet, in another aspect, the catalyst activity can be greater than 700 g/g/hr, greater than 1000 g/g/hr, or greater than 2000 g/g/hr, and often as high as 5000-10,000 g/g/hr. Illustrative and non-limiting ranges for the catalyst activity include from 500 to 5000, from 750 to 4000, or from 1000 to 3500 g/g/hr, and the like. These activities are measured under slurry polymerization conditions, with a triisobutylaluminum co-catalyst, using isobutane as the diluent, at a polymerization temperature of 95° C. and a reactor pressure of 590 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, catalyst component I, catalyst component II, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation. A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually from 200 to 500 psig (1.4 MPa to 3.4 MPa). High pressure polymerization in tubular or autoclave reactors is generally run at from 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per minute, and conditioned for 40 hours at room temperature in accordance with ASTM D1505 and ASTM D4703. The PENT (Pennsylvania Edge Notch Tensile) values were determined in accordance with ASTM F1473 at a temperature of 80° C. under a stress of 2.4 MPa (thus, PENT @ 2.4 MPa). The measured time to failure (hr) is the result of the PENT test.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the broad standard. An integral table of the broad standard was pre-determined in a separate experiment with SEC-MALS. Mn is the number-average molecular weight, Mw is the weight-average molecular weight, Mz is the z-average molecular weight, Mv is the viscosity-average molecular weight, and Mp is the peak molecular weight (location, in molecular weight, of the highest point of the molecular weight distribution curve). The IB parameter was determined from the molecular weight distribution curve (plot of dW/d (Log M) vs. Log M; normalized to an area equal to 1), and is defined as 1/[dW/d (Log M)]$_{MAX}$. IVc is the intrinsic viscosity [η], which is calculated based on Equation 8:

$$[\eta] = K\, M_v^a \qquad \text{Eq. 8}$$

where Mv is the viscosity-average molecular weight, K and a are Mark-Houwink constants for the polymer of interest. For polyethylene, K and a are 3.95E-04 (dL/g) and 0.726 (unitless), respectively. Mv is calculated based on Equation 9:

$$M_V = \left[\frac{\sum_i w_i M_i^\alpha}{\sum_i w_i}\right]^{1/a} \qquad \text{Eq. 9}$$

where $w_i$ and $M_i$ are weight fraction and molecular weight of slice i, respectively.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is shown in Equation 10:

$$|\eta^*(\omega)| = \frac{\eta_0}{[1 + (\tau_\eta \omega)^a]^{(1-n)/a}} \qquad \text{Eq. 10}$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987). The tan δ at 0.1 sec$^{-1}$, viscosity at 0.1 sec$^{-1}$, viscosity at 100 sec$^{-1}$, and viscosity at HLMI (viscosity at the HLMI stress for the polymer at its HLMI) properties were measured values, and not determined using the Carreau-Yasuda (CY) empirical model.

Short chain branch content and short chain branching distribution (SCBD) across the molecular weight distribution were determined via an IR5-detected GPC system (IR5-GPC) using the method established by Yu (Y. Yu, Macromolecular Symposium, 2020, 390, 1900014), wherein the GPC system was a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Characterisation SA, Spain) was connected to the GPC columns via a hot-transfer line. Chromatographic data was obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

The long chain branches (LCBs) per 1,000,000 total carbon atoms of the overall polymer were calculated using the method of Janzen and Colby (*J. Mol. Struct.*, 485/486, 569-584 (1999)), from values of zero shear viscosity, $\eta_o$ (determined from the Carreau-Yasuda model, described hereinabove), and measured values of Mw obtained using GPC discussed above.

Metals content, such as the amount of catalyst residue in the ethylene polymer or article, can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Inventive Examples 3-5 and Comparative Examples

Comparative Examples A-B and Inventive Examples 3-5 were produced as follows, and as summarized in Table I. Pilot plant polymerization experiments to produce the bimodal ethylene-1-hexene copolymers were conducted in a 27.3-gallon slurry loop reactor by contacting an isobutane solution of MET 1 and MET 2 (structures below), with triisobutylaluminum (TIBA) and a sulfated alumina activator-support in a 0.5 L stirred autoclave with continuous output to the loop reactor.

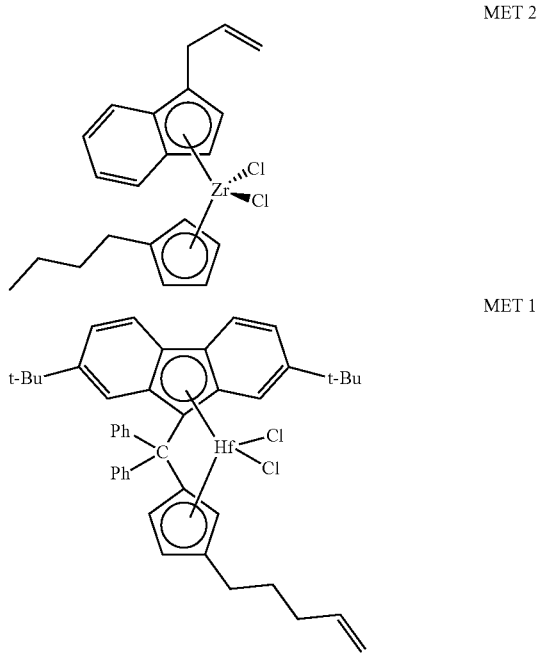

Pre-contacting was carried out in the following manner. A TIBA solution and both metallocene solutions in isobutane were fed as separate streams into a manifold upstream of the sulfated alumina activator feeder outlet where they contacted each other and were combined with isobutane flush. The sulfated alumina was flushed with the combined solution into the autoclave, briefly contacting the TIBA/metallocenes mixture/solid activator just before entering the autoclave. The combined solution flush used to transport the solid activator into the autoclave was set at a rate that would result in a residence time of approximately 10-30 minutes in the autoclave by adjusting the isobutane flow rate. The total flow from the autoclave then entered the loop reactor.

Ethylene used was polymerization grade ethylene (obtained from Union Carbide Corporation) which was purified through a column of alumina activated at 250° C. in nitrogen, and the 1-hexene used was polymerization grade 1-hexene (obtained from Chevron Chemicals Company) which was further purified by distillation and subsequently passed through a column of alumina activated at 250° C. in nitrogen. The loop reactor was a liquid full, 15.2 cm diameter, loop reactor, having a volume of 27.3 gallons (103.3 liters). Liquid isobutane was used as the diluent. Some hydrogen was added to regulate the molecular weight of the low molecular weight component of the polymer product. The isobutane was polymerization grade isobutane (obtained from Phillips Petroleum Company, Borger, Tex.) that was further purified by distillation and subsequently passed through a column of alumina activated at 250° C. in nitrogen.

Reactor conditions included a pressure around 580 psi (4 MPa) and the polymerization conditions shown in Table I. The reactor was operated to have a residence time of about 1.1 hours. The solid activator was added through a 0.35 cc circulating ball-check feeder and fed to the 0.5-L autoclave as described above. Metallocene concentrations in the reactor were within a range of 2-4 parts per million (ppm) of the diluent in the polymerization reactor. Polymer was removed from the reactor at the rate of 20-50 lb/hr and recovered in a flash chamber. A Vulcan dryer was used to dry the polymer under nitrogen at about 60-80° C. To prevent static buildup of the reactor, a small amount (less than 5 ppm, by weight, of diluent) of a commercial antistatic agent sold as "Stadis 450" was usually added.

The sulfated alumina activator-support was prepared by chemically-treating alumina with a sulfate source. W.R. Grace Alumina A was sulfated by impregnation with an aqueous solution containing about 15-20% $(NH_4)_2SO_4$ or $H_2SO_4$. This sulfated alumina was calcined at 550° C. in air (240° C./hr ramp rate), with a 3 hr hold period at this temperature. Afterward, the sulfated alumina was collected and stored under dry nitrogen, and was used without exposure to the atmosphere.

Inventive Example 4 was produced with polymerization conditions similar to that of Inventive Example 5, except that the ratios of hydrogen/ethylene and 1-hexene/ethylene were varied.

Comparative Examples 1-5 (ethylene/1-hexene copolymers) were produced using catalyst systems containing sulfated alumina, but with different dual metallocene compounds. Comparative Examples 1 and 2 used phenyhbuten-3-yl)methylidene(η5-cyclopentadienyl)(η5-2,7-di-tert-butylfluoren9-ylidene)zirconium dichloride instead of MET 1; Comparative Example 3 used the bridged metallocene of Comparative Examples 1 and 2 with bis-indenyl zirconium dichloride instead of MET 2; Comparative Example 4 used the bridged metallocene of Comparative Examples 1 and 2 with bis-indenyl zirconium dibenzyl instead of MET 2; and Comparative Example 5 used a zirconium analog of MET 1 with MET 2.

Unimodal Examples 1-5 were comparative ethylene/1-hexene copolymers produced using a chromium-based catalyst system (Chevron-Phillips Chemical Company LP).

Figure 2:
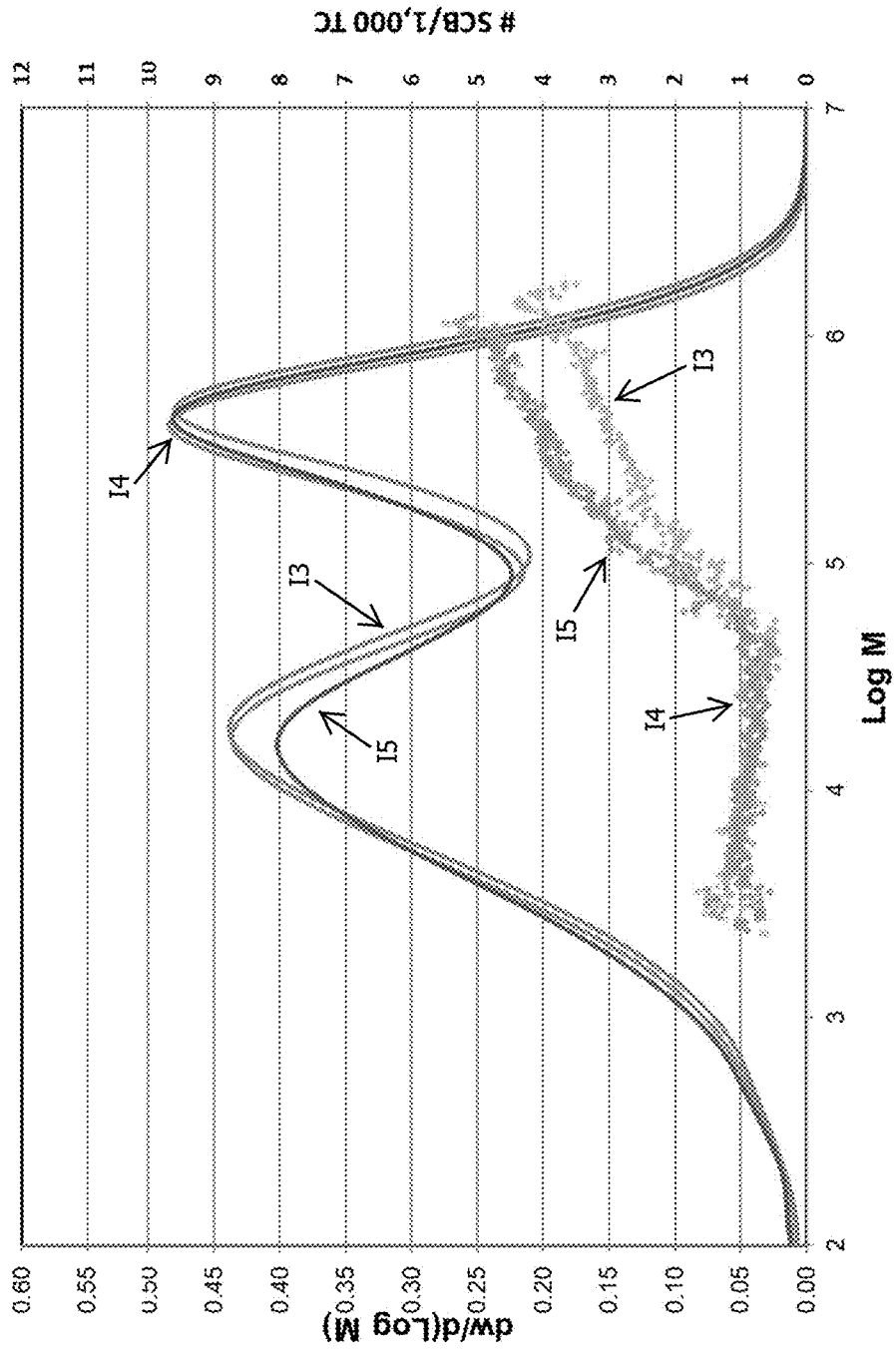
FIG. 2 presents a plot of the short chain branch distributions across the molecular weight distributions of the polymers of Inventive Examples 3-5.
Figure 3:
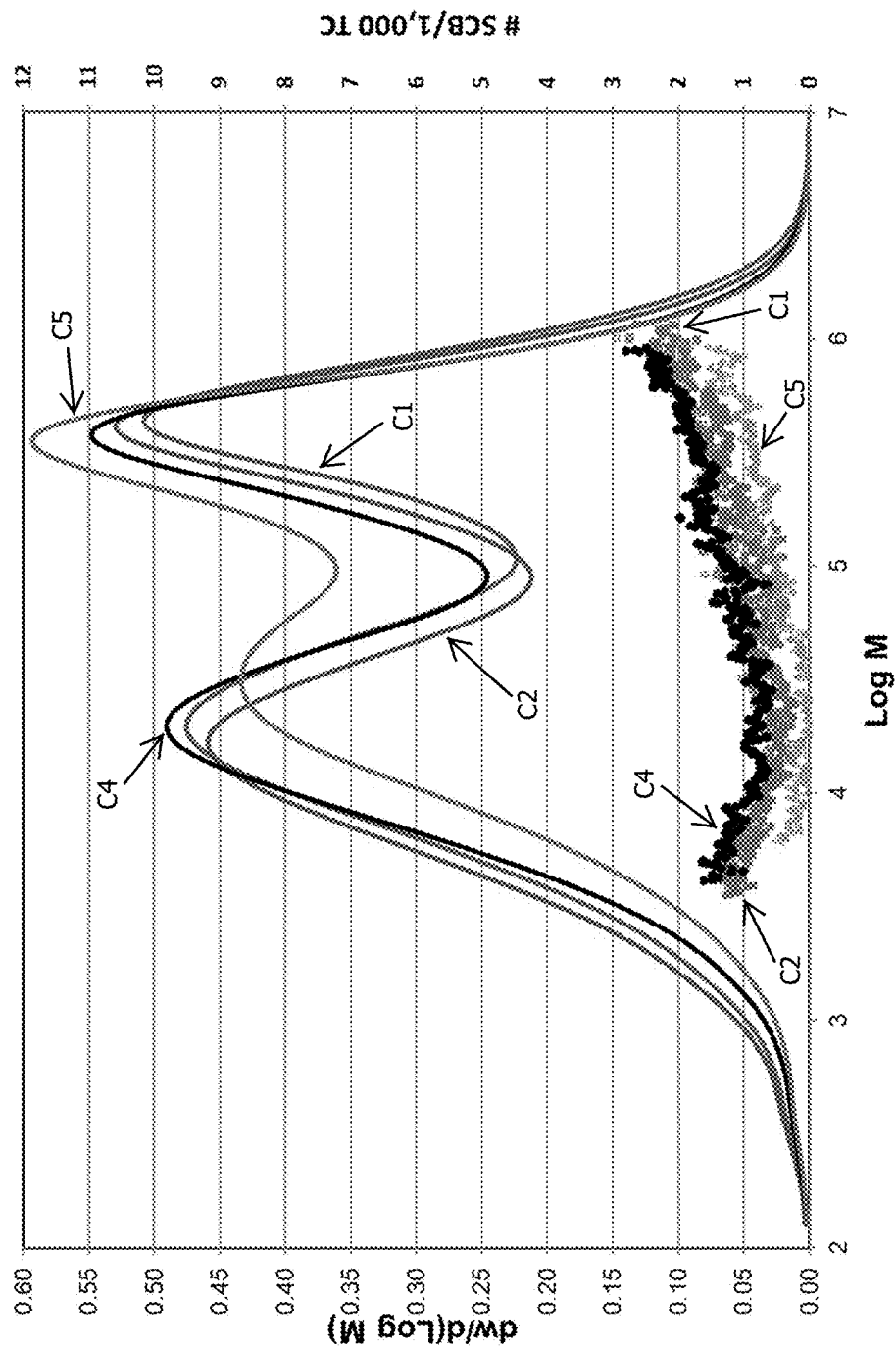
FIG. 3 presents a plot of the short chain branch distributions across the molecular weight distributions of the polymers of Comparative Examples 1-2 and 4-5.

Tables II-V summarize polymer properties of the inventive and comparative ethylene copolymers, and FIGS. 2-3 illustrates the bimodal molecular weight distributions (amount of polymer versus the logarithm of molecular weight) and short chain branch distributions (SCBDs) of Inventive Examples 3-5 and Comparative Examples 1-2 and 4-5.

As shown in the tables, at generally equivalent Mw's, Inventive Examples 3-5 surprisingly had PENT values (ASTM F1473, 80° C., 2.4 MPa) of 14,000 to 16,000 hr, and much greater than Comparative Examples 1-5 and Unimodal Examples 1-5. Also, the PENT values for Inventive Examples 3-5 were much higher than the PENT values for Comparative Examples A-B, which were produced using the same catalyst system (same metallocene compounds, TIBA co-catalyst, and sulfated alumina).

Figure 4:
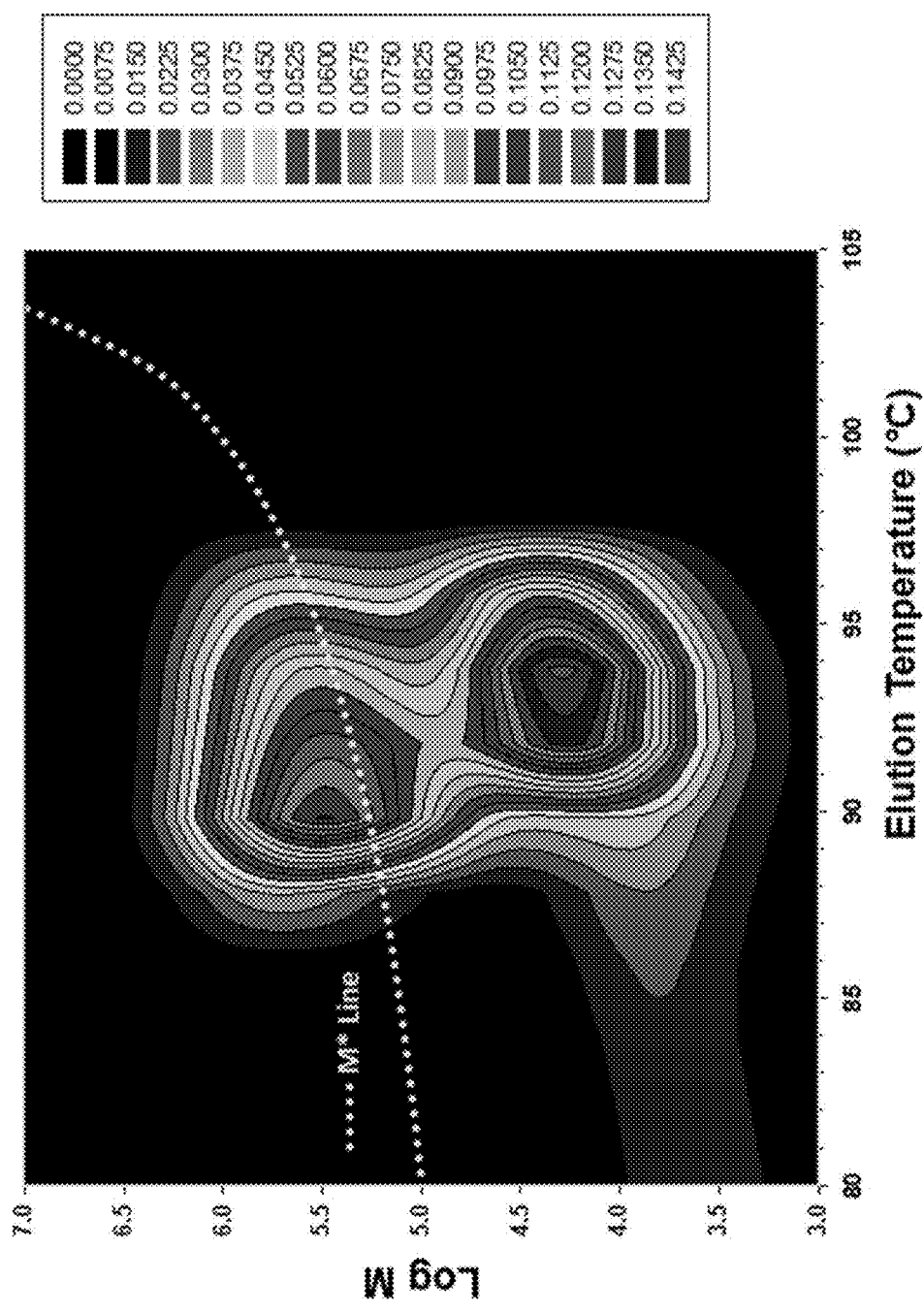
FIGS. 4-6 present 2D contour plots of the logarithm of the molecular weight versus the elution temperatures for the polymers of Inventive Example 4, Comparative Example 2, and Unimodal Example 4, respectively.
Figure 5:
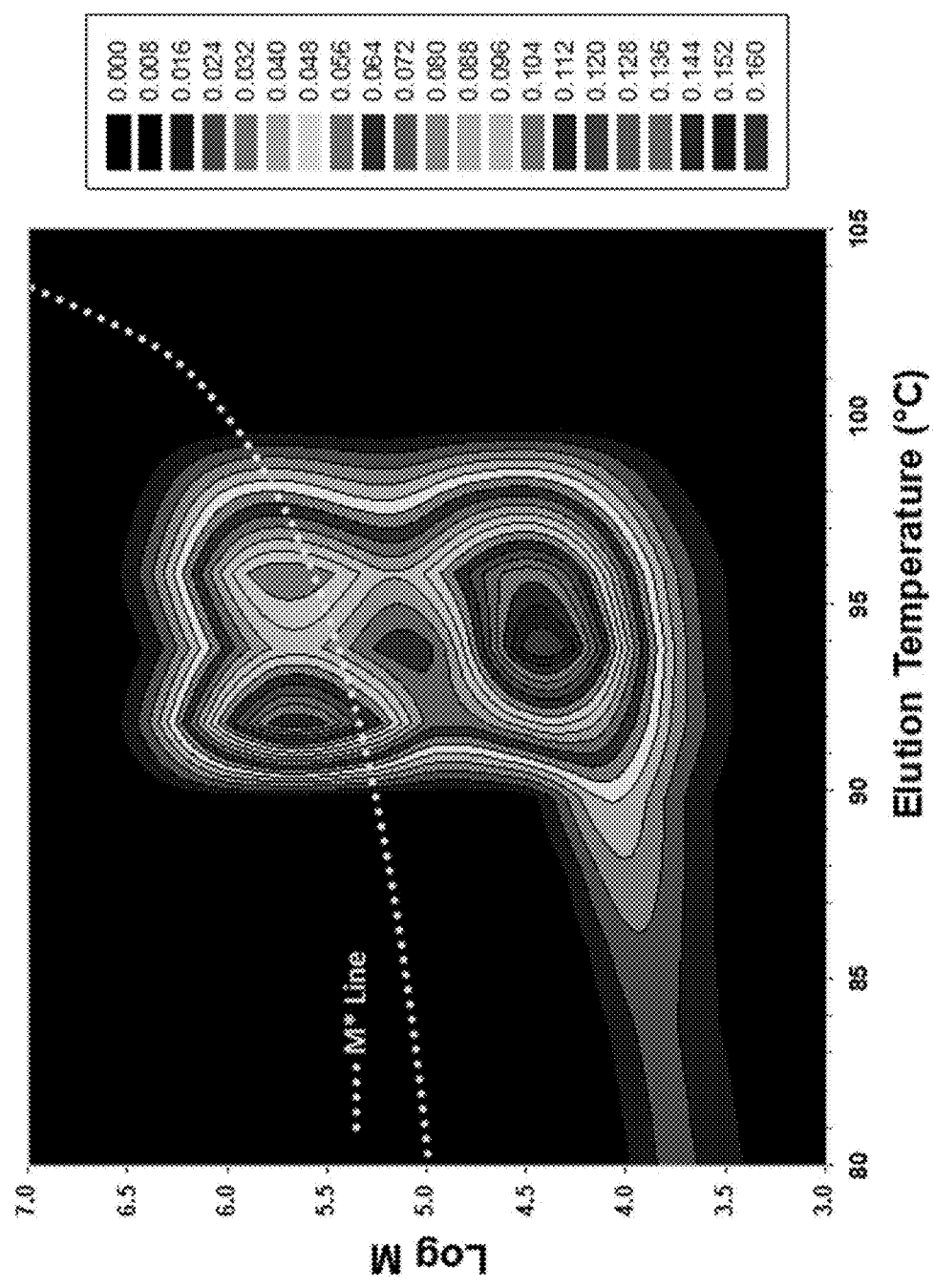
Figure 6:
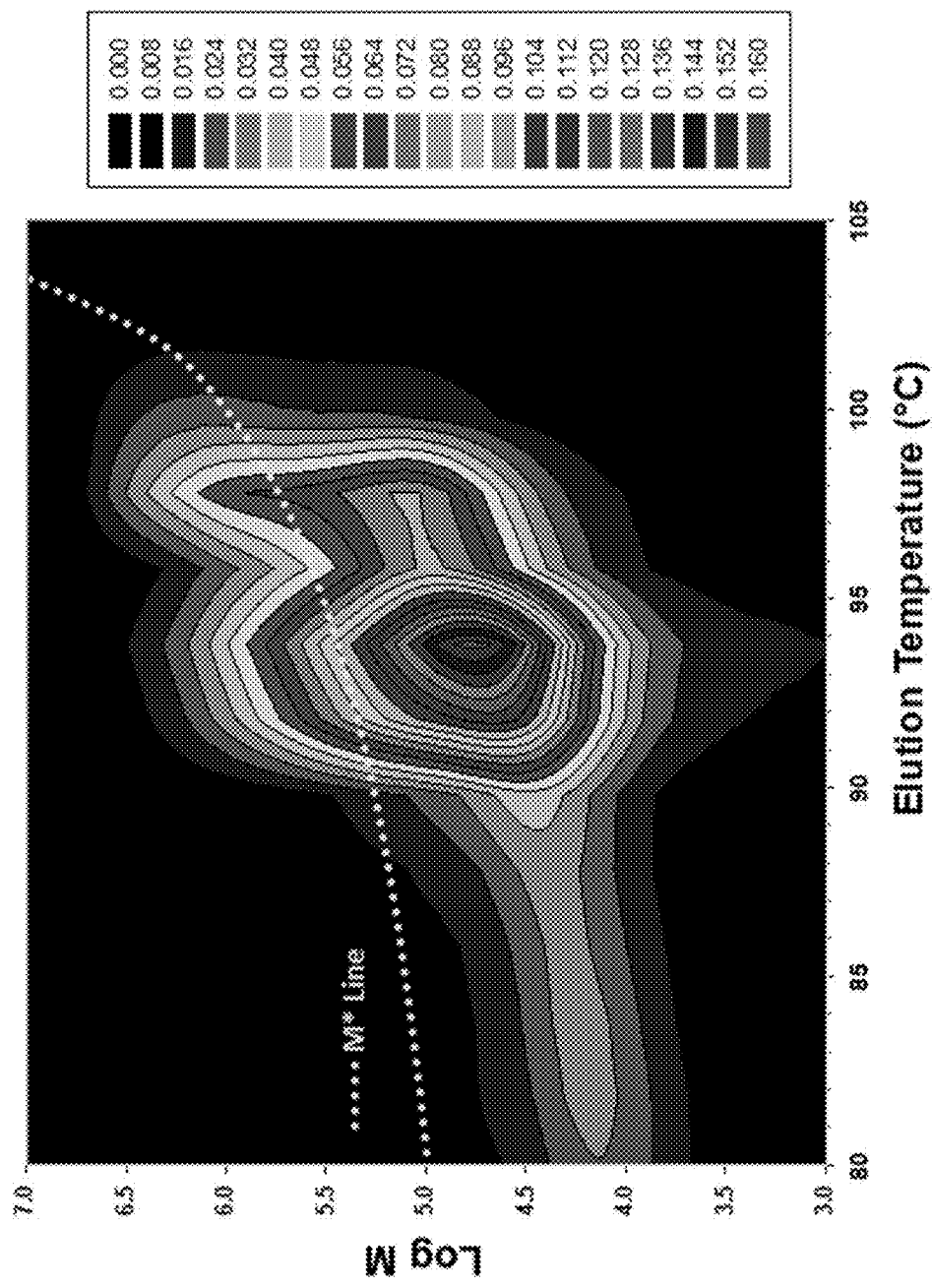

Likewise, at generally equivalent Mw's, Inventive Examples 3-5 surprisingly had W90 and Wh values (wt. %) of 7.5 to 13 wt. %, and much greater than Comparative Examples 1-5 and Unimodal Examples 1-5. Also, the W90 and Wh values for Inventive Examples 3-5 were higher than the W90 and Wh values for Comparative Examples A-B, which were produced using the same catalyst system (same metallocene compounds, TIBA co-catalyst, and sulfated alumina). FIGS. 4-6 are 2D contour plots of aTREF-hSEC for the polymers of Inventive Example 4, Comparative Example 2, and Unimodal Example 4, respectively (See Y. Yu, M. H. Hildebrand, Development of an Integrated On-line Two-Dimensional Analytical TREF-High Throughput SEC Technique for Polyolefins Characterization, Macromolecular Symposia, 2020, 390, 1900015). In each figure, the dotted line shows the critical molecular weight, M*, as described herein. W90 and Wh were calculated using Equation 11 and Equation 12, respectively, $$W_{90} = \int_{T>RT}^{90} \int_{M>M^*}^{\infty} \left\{ \left(\frac{d\Omega}{dT}\right)_i \left(\frac{dw}{d(\text{Log}M)}\right)_j \right\} dT_i d(\text{Log}M)_j \quad \text{Eq. 11}$$

$$W_h = \int_{80}^{90} \int_{M>M^*}^{\infty} \left\{ \left(\frac{d\Omega}{dT}\right)_i \left(\frac{dw}{d(\text{Log}M)}\right)_j \right\} dT_i \, d(\text{Log}M)_j \quad \text{Eq. 12}$$

While each of Comparative Examples A-B and Inventive Examples 3-5 had specific attributes that were improved over Comparative Examples 1-5 and Unimodal Examples 1-5, Inventive Examples 3-5 had the most beneficial combination of overall properties. The polymers of Inventive Examples 3-5 had a unique combination of density, Mn, Mw/Mn, relaxation time, CY-a parameter, HLMI, viscosity at HLMI, and SCBD features that were not present in any of the other polymers. For instance, as shown in the figures and in Table II, Inventive Examples 3-5 had surprisingly low levels of SCB content in the low molecular weight fraction of the polymer in combination with unexpectedly high levels of SCB content in the high molecular weight fraction of the polymer, as compared to the Comparative Examples.

TABLE I

| | Polymerization Conditions | | | |
|---|---|---|---|---|
| Example | Comparative A | Comparative B | Inventive 3 | Inventive 5 |
| Activator-Support | Sulfated Alumina | Sulfated Alumina | Sulfated Alumina | Sulfated Alumina |
| Metallocene to Reactor (ppm) | MET1: 2.25 MET2: 1.02 | MET1: 2.51 MET2: 1.05 | MET1: 2.35 MET2: 1.23 | MET1: 1.13 MET2: 1.18 |
| Autoclave Residence Time (Min) | 14.68 | 14.17 | 13.71 | 30.14 |

TABLE I-continued

Polymerization Conditions

| Example | Comparative A | Comparative B | Inventive 3 | Inventive 5 |
|---|---|---|---|---|
| Co-catalyst Type | TIBA | TIBA | TIBA | TIBA |
| Co-catalyst ppm (precontactor + reactor) | 19 + 168.5 | 19.69 + 89.5 | 116.61 | 74.50 |
| Temperature (° F.) | 202.9 | 202.8 | 202.8 | 196.9 |
| Ethylene (mol %) | 13.93 | 15.12 | 15.10 | 14.12 |
| 1-hexene (mol %) | 0.49 | 0.44 | 0.53 | 0.51 |
| C6=/C2= (Mole Ratio) | 0.04 | 0.03 | 0.035 | 0.036 |
| $H_2$ (mlb/hr) | 8 | 8 | 8 | 19 |
| C2= Feed Rate (lb/hr) | 29.59 | 29.60 | 19.89 | 53.63 |
| 1-Hexene Feed Rate (lb/hr) | 0.61 | 0.61 | 0.49 | 1.06 |
| Total iC4 Flow Rate (lb/hr) | 61.48 | 60.07 | 56.39 | 52.33 |
| Solids (wt. %) | 24.22 | 24.3 | 27.25 | 45.90 |
| Polymer Production (lb/hr) | 22.67 | 22.42 | 20.07 | 49.45 |

TABLE II

Polymer Properties

| Example | HLMI (g/10 min) | Density (g/cc) | PENT (2.4 MPa, hr) | R2DI | W90 (wt. %) | Wh (wt. %) | SCBs @ Mp-HMW/ SCBs @ Mp-LMW | LCBs per million |
|---|---|---|---|---|---|---|---|---|
| Comparative A | 4.6 | 0.952 | 9,549 | 1.233 | 7.04% | 7.00% | — | 0.88 |
| Comparative B | 12.5 | 0.953 | 11,391 | 1.145 | 3.19% | 3.19% | — | 1.34 |
| Inventive 3 | 7.5 | 0.953 | 14,848 | 1.369 | 7.77% | 7.77% | 4.7 | 1.61 |
| Inventive 4 | 8.0 | 0.950 | 15,211 | 1.449 | 12.14% | 12.14% | 5.7 | 1.88 |
| Inventive 5 | 7.1 | 0.950 | 15,907 | 1.322 | 11.25% | 11.25% | 4.7 | 1.70 |
| Comparative 1 | 6.7 | 0.954 | 2,536 | 0.945 | 0.09% | 0.09% | 3.5 | — |
| Comparative 2 | 9.5 | 0.953 | 4,996 | 0.975 | 0.16% | 0.16% | 3.1 | — |
| Comparative 3 | 5.7 | 0.952 | 2,016 | 0.846 | 0.21% | 0.21% | — | — |
| Comparative 4 | 6.8 | 0.951 | 2,967 | 0.801 | 0.51% | 0.51% | 2.1 | — |
| Comparative 5 | 4.0 | 0.951 | 578 | 0.809 | 0.01% | 0.01% | — | — |
| Unimodal 1 | 10.0 | 0.948 | 7 | 0.286 | 0.07% | 0.06% | — | — |
| Unimodal 2 | 11.0 | 0.944 | 331 | 0.504 | 1.74% | 0.78% | — | — |
| Unimodal 3 | 2.8 | 0.950 | 2,560 | 0.625 | 0.48% | 0.38% | — | — |
| Unimodal 4 | 9.0 | 0.948 | 972 | 0.637 | 2.10% | 1.10% | — | — |
| Unimodal 5 | 20.0 | 0.939 | 2,847 | 0.722 | 2.78% | 1.81% | — | — |

TABLE III

Molecular Weight Characterization (kg/mol)

| Example | Mn | Mw | Mz | Mv | Mp (LMW) | Mp (HMW) | Mw/Mn | Mz/Mw | IB | IVc |
|---|---|---|---|---|---|---|---|---|---|---|
| Comparative A | 8.6 | 292.1 | — | — | 19.3 | 457 | 34.0 | — | — | — |
| Comparative B | 8.1 | 264.1 | — | — | 17.8 | 441 | 32.6 | — | — | — |
| Inventive 3 | 9.6 | 289.2 | 1330 | 210.3 | 20.5 | 520 | 30.1 | 4.6 | 2.09 | 2.89 |
| Inventive 4 | 10.9 | 256.8 | 1010 | 189.0 | 19.6 | 492 | 23.6 | 3.9 | 2.00 | 2.67 |
| Inventive 5 | 7.1 | 232.4 | 917 | 170.9 | 17.1 | 449 | 33.0 | 3.9 | 2.10 | 2.49 |
| Comparative 1 | 16.1 | 261.7 | 969 | 196.3 | 22.4 | 506 | 16.3 | 3.7 | 1.79 | 2.75 |
| Comparative 2 | 10.1 | 261.8 | 1097 | 190.6 | 20.1 | 498 | 26.0 | 4.2 | 2.02 | 2.69 |
| Comparative 3 | 14.2 | 230.0 | 948 | 171.8 | 19.1 | 402 | 16.2 | 4.1 | 1.97 | 2.50 |
| Comparative 4 | 12.5 | 225.7 | 968 | 170.2 | 20.8 | 436 | 18.0 | 4.3 | 1.92 | 2.48 |
| Comparative 5 | 19.6 | 247.5 | 778 | 197.2 | 36.8 | 414 | 12.7 | 3.1 | 1.68 | 2.76 |
| Unimodal 1 | 20.8 | 175.9 | 1055 | 133.8 | — | — | 8.5 | 6.0 | 1.33 | 2.08 |
| Unimodal 2 | 18.3 | 255.4 | 1860 | 181.1 | — | — | 13.9 | 7.3 | 1.57 | 2.59 |
| Unimodal 3 | 5.9 | 450.2 | 3078 | 291.2 | — | — | 76.2 | 6.8 | 2.52 | 3.66 |
| Unimodal 4 | 10.1 | 310.2 | 3225 | 198.3 | — | — | 30.7 | 10.4 | 1.99 | 2.77 |
| Unimodal 5 | 13.1 | 203.1 | 1513 | 143.9 | — | — | 15.5 | 7.4 | 1.58 | 2.19 |

TABLE IV

Rheological Characterization at 190° C.

| Example | Zero shear (Pa-sec) | Tau(η) (sec) | CY-a parameter | η @ 100 (Pa-sec) | η @ HLMI (Pa-sec) | Tan d @ 0.1 (degrees) | η @ 0.1/ η @ 100 |
|---|---|---|---|---|---|---|---|
| Comparative A | 1.72E+05 | 1.37 | 0.591 | 2858 | 8831 | 3.20 | 41.5 |
| Comparative B | 1.52E+05 | 1.33 | 0.576 | 2569 | 5828 | 3.17 | 40.2 |
| Inventive 3 | 1.98E+05 | 1.87 | 0.601 | 2580 | 6357 | 2.79 | 50.1 |
| Inventive 4 | 1.42E+05 | 1.33 | 0.601 | 2417 | 4697 | 3.29 | 41.2 |
| Inventive 5 | 1.36E+05 | 1.23 | 0.568 | 2415 | 4524 | 3.24 | 38.3 |
| Comparative 1 | 1.80E+05 | 1.69 | 0.586 | 2539 | 5800 | 2.87 | 46.6 |
| Comparative 2 | 1.33E+05 | 1.14 | 0.573 | 2517 | 5271 | 3.38 | 36.8 |
| Comparative 3 | 1.32E+05 | 0.93 | 0.527 | 2815 | 7157 | 3.39 | 31.7 |
| Comparative 4 | 1.25E+05 | 0.99 | 0.504 | 2504 | 4749 | 3.17 | 32.2 |
| Comparative 5 | 1.18E+05 | 0.78 | 0.540 | 2926 | 7950 | 3.79 | 28.7 |
| Unimodal 1 | 3.51E+06 | 11.35 | 0.142 | 1808 | 1588 | 1.32 | 33.6 |
| Unimodal 2 | 3.09E+06 | 11.53 | 0.158 | 2221 | 2683 | 1.32 | 36.3 |
| Unimodal 3 | 1.66E+07 | 406.90 | 0.288 | 2458 | 5282 | 0.71 | 140.0 |
| Unimodal 4 | 7.73E+06 | 78.30 | 0.167 | 1868 | 1676 | 1.07 | 55.4 |
| Unimodal 5 | 9.35E+05 | 2.57 | 0.161 | 1743 | 1466 | 1.55 | 26.7 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having (or characterized by) a density in a range from 0.94 to 0.96 g/cm$^3$, a Mn in a range from 5,000 to 14,000 g/mol, a ratio of Mw/Mn in a range from 18 to 40, and a PENT value at 2.4 MPa of at least 11,500 hr.

Aspect 2. An ethylene polymer having (or characterized by) a density in a range from 0.94 to 0.96 g/cm$^3$, a Mn in a range from 5,000 to 14,000 g/mol, a ratio of Mw/Mn in a range from 18 to 40, and a W90 (and/or Wh) in a range from 7.5 to 15 wt. %.

Aspect 3. The polymer defined in aspect 1 or 2, wherein the ethylene polymer has a high load melt index (HLMI) in any range disclosed herein, e.g., from 1 to 25 g/10 min, from 2 to 20 g/10 min, or from 3 to 15 g/10 min.

Aspect 4. An ethylene polymer having (or characterized by) a density in a range from 0.94 to 0.96 g/cm$^3$, a Mn in a range from 5,000 to 14,000 g/mol, a ratio of Mw/Mn in a range from 18 to 40, a relaxation time in a range from 0.5 to 3.5 sec, a CY-a parameter in a range from 0.48 to 0.68, a high load melt index (HLMI) in a range from 5 to 11 g/10 min, a viscosity at HLMI in a range from 3,000 to 7,500 Pa-sec, and a higher molecular weight component (HMW) and a lower molecular weight (LMW) component, wherein a ratio of a number of SCBs per 1000 total carbon atoms at Mp of the HMW component to a number of SCBs per 1000 total carbon atoms at Mp of the LMW component is in a range from 3.5 to 8.

Aspect 5. The polymer defined in aspect 4, wherein the ethylene polymer has a high load melt index (HLMI) in any range disclosed herein, e.g., from 5 to 10 g/10 min, from 6 to 11 g/10 min, or from 6 to 10 g/10 min.

Aspect 6. The polymer defined in aspect 4 or 5, wherein the ethylene polymer has a PENT value at 2.4 MPa (ASTM F1473) in any range disclosed herein, e.g., at least 5,000 hr, at least 7,500 hr, at least 10,000 hr, at least 11,500 hr, or at least 13,000 hr.

Aspect 7. The polymer defined in any one of aspects 4-6, wherein the ethylene polymer has a W90 (and/or Wh) in any range disclosed herein, e.g., from 3 to 15 wt. %, from 5 to 15 wt. %, or from 7.5 to 15 wt. %.

Aspect 8. The polymer defined in any one of the preceding aspects, wherein the ethylene polymer has a density in any range disclosed herein, e.g., from 0.94 to 0.958 g/cm$^3$, from 0.942 to 0.96 g/cm$^3$, from 0.942 to 0.958 g/cm$^3$, or from 0.945 to 0.958 g/cm$^3$.

Aspect 9. The polymer defined in any one of the preceding aspects, wherein the ethylene polymer has a Mn in any range disclosed herein, e.g., from 5,000 to 13,000 g/mol, from 5,000 to 12,000 g/mol, from 6,000 to 14,000 g/mol, or from 6,000 to 12,000 g/mol.

Aspect 10. The polymer defined in any one of the preceding aspects, wherein the ethylene polymer has a ratio of Mw/Mn in any range disclosed herein, e.g., from 18 to 38, from 20 to 40, from 20 to 38, from 20 to 35, or from 22 to 34.

Aspect 11. The polymer defined in any one of the preceding aspects, wherein the ethylene polymer has a relaxation time (Tau(eta) or $\tau(\eta)$) in any range disclosed herein, e.g., from 0.5 to 3.5 sec, from 0.5 to 2.5 sec, from 1 to 3 sec, or from 1 to 2 sec.

Aspect 12. The polymer defined in any one of the preceding aspects, wherein the ethylene polymer has a CY-a parameter in any range disclosed herein, e.g., from 0.48 to 0.68, from 0.48 to 0.65, from 0.5 to 0.68, from 0.5 to 0.65, from 0.52 to 0.63, or from 0.55 to 0.61.

Aspect 13. The polymer defined in any one of the preceding aspects, wherein the ethylene polymer has a viscosity at HLMI (eta @ HLMI or η @ HLMI) in any range disclosed herein, e.g., from 3,000 to 7,500, from 3,000 to 7,000, from 3,500 to 7,000, from 3,500 to 6,500, from 4,000 to 7,000, from 4,000 to 6,500, or from 4,300 to 6,500 Pa-sec.

Aspect 14. The polymer defined in any one of the preceding aspects, wherein the ethylene polymer has a Mw in any range disclosed herein, e.g., from 175,000 to 350,000 g/mol, from 200,000 to 325,000 g/mol, from 200,000 to 300,000 g/mol, or from 225,000 to 300,000 g/mol.

Aspect 15. The polymer defined in any one of the preceding aspects, wherein the ethylene polymer has a Mz in any range disclosed herein, e.g., from 700,000 to 2,000,000 g/mol, from 700,000 to 1,700,000 g/mol, from 750,000 to 1,500,000 g/mol, from 850,000 to 1,400,000 g/mol, or from 900,000 to 1,350,000 g/mol.

Aspect 16. The polymer defined in any one of the preceding aspects, wherein the ethylene polymer has a ratio of Mz/Mw in any range disclosed herein, e.g., from 2.5 to 8, from 3 to 8, from 3 to 7, from 3 to 6, from 3.5 to 6, from 3.5 to 5.5, or from 3.5 to 5.

Aspect 17. The polymer defined in any one of the preceding aspects, wherein the ethylene polymer has an IB parameter in any range disclosed herein, e.g., from 1.8 to 2.3, from 1.85 to 2.25, from 1.9 to 2.2, or from 1.95 to 2.15.

Aspect 18. The polymer defined in any one of the preceding aspects, wherein the ethylene polymer has a viscosity at 100 sec$^{-1}$ (eta @ 100 or η @ 100) in any range disclosed herein, e.g., from 2,200 to 2,800, from 2,250 to 2,750, from 2,300 to 2,700, from 2,350 to 2,650, or from 2,400 to 2,600 Pa-sec.

Aspect 19. The polymer defined in any one of the preceding aspects, wherein the ethylene polymer has a ratio of η @ 0.1/@ 100 in any range disclosed herein, e.g., from 20 to 80, from 25 to 75, from 25 to 70, from 30 to 60, from 33 to 55, or from 36 to 52.

Aspect 20. The polymer defined in any one of the preceding aspects, wherein the ethylene polymer has a tan δ (tan d or tangent delta) at 0.1 sec$^{-1}$ in any range disclosed herein, e.g., from 2.2 to 3.9 degrees, from 2.3 to 3.8 degrees, from 2.4 to 3.7 degrees, from 2.5 to 3.6 degrees, or from 2.6 to 3.5 degrees.

Aspect 21. The polymer defined in any one of the preceding aspects, wherein the ethylene polymer contains from 0.5 to 5 LCBs, from 1 to 4 LCBs, from 1.4 to 3 LCBs, from 1.4 to 2.5 LCBs, from 1.45 to 2.25 LCBs, from 1.45 to 2.05 LCBs, or from 1.5 to 2 LCBs, per 1,000,000 total carbon atoms.

Aspect 22. The polymer defined in any one of the preceding aspects, wherein the ethylene polymer has a reverse comonomer distribution, e.g., the number of short chain branches (SCBs) per 1000 total carbon atoms of the polymer at Mw is greater than at Mn, or the number of SCBs per 1000 total carbon atoms of the polymer at Mz is greater than at Mw, or the number of SCBs per 1000 total carbon atoms of the polymer at Mz is greater than at Mn, or any combination thereof.

Aspect 23. The polymer defined in any one of the preceding aspects, wherein the ethylene polymer has a Mp (LMW) in any range disclosed herein, e.g., from 10,000 to 30,000 g/mol, from 12,000 to 26,000 g/mol, from 15,000 to 24,000 g/mol, or from 16,000 to 22,000 g/mol.

Aspect 24. The polymer defined in any one of the preceding aspects, wherein the ethylene polymer has a Mp (HMW) in any range disclosed herein, e.g., from 400,000 to 600,000 g/mol, from 410,000 to 560,000 g/mol, from 420,000 to 550,000 g/mol, or from 430,000 to 540,000 g/mol.

Aspect 25. The polymer defined in any one of the preceding aspects, wherein a ratio of a number of SCBs per 1000 total carbon atoms at Mp of the HMW component to a number of SCBs per 1000 total carbon atoms at Mp of the LMW component is in any range disclosed herein, e.g., from 3.5 to 8, from 3.5 to 7, from 3.5 to 6.5, from 4 to 7, from 4 to 6.5, or from 4.3 to 6.

Aspect 26. The polymer defined in any one of the preceding aspects, wherein the ethylene polymer has a bimodal molecular weight distribution.

Aspect 27. The polymer defined in any one of the preceding aspects, wherein the ethylene polymer is a single reactor product, e.g., not a post-reactor blend of two polymers, for instance, having different molecular weight characteristics.

Aspect 28. The polymer defined in any one of the preceding aspects, wherein the ethylene polymer comprises an ethylene/α-olefin copolymer and/or an ethylene homopolymer.

Aspect 29. The polymer defined in any one of the preceding aspects, wherein the ethylene polymer comprises an ethylene homopolymer, an ethylene/1-butene copolymer, an ethylene/1-hexene copolymer, and/or an ethylene/1-octene copolymer.

Aspect 30. The polymer defined in any one of the preceding aspects, wherein the ethylene polymer comprises an ethylene/1-hexene copolymer.

Aspect 31. The polymer defined in any one of the preceding aspects, wherein the ethylene polymer contains, independently, less than 0.1 ppm (by weight), less than 0.08 ppm, less than 0.05 ppm, or less than 0.03 ppm, of Mg, V, Ti, or Cr.

Aspect 32. The polymer defined in any one of the preceding aspects, wherein the polymer further comprises any additive disclosed herein, e.g., an antioxidant, an acid scavenger, an antiblock additive, a slip additive, a colorant, a filler, a polymer processing aid, a UV additive, or combinations thereof.

Aspect 33. An article comprising the ethylene polymer defined in any one of aspects 1-32.

Aspect 34. An article comprising the ethylene polymer defined in any one of aspects 1-32, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 35. A pipe or blow molded product comprising (or produced from) the ethylene polymer defined in any one of aspects 1-32.

We claim:

1. An ethylene polymer having:
    a density in a range from 0.94 to 0.96 g/cm$^3$;
    a Mn in a range from 5,000 to 14,000 g/mol;
    a ratio of Mw/Mn in a range from 18 to 40; and
    a PENT value at 80° C. and 2.4 MPa of at least 11,500 hr;
    wherein the polymer contains from 1 to 4 long chain branches per 1,000,000 total carbon atoms.

2. An article comprising the polymer of claim 1.

3. The polymer of claim 1, wherein the polymer comprises an ethylene homopolymer, an ethylene/1-butene copolymer, an ethylene/1-hexene copolymer, and/or an ethylene/1-octene copolymer.

4. The polymer of claim 3, wherein the PENT value is at least 13,500 hr.

5. The polymer of claim 4, wherein the polymer is further characterized by:
    a high load melt index (HLMI), determined at 190° C. with a 21.6 kg weight, in a range from 1 to 25 g/10 min.

6. The polymer of claim 4, wherein:
    the density is in a range from 0.942 to 0.958 g/cm$^3$;
    the Mn is in a range from 6,000 to 12,000 g/mol; and
    the ratio of Mw/Mn is in a range from 20 to 35.

7. The polymer of claim 4, wherein the polymer is further characterized by:
    a viscous relaxation time, according to the Carreau-Yasuda empirical model, in a range from 0.5 to 3.5 sec;
    a CY-a parameter in a range from 0.48 to 0.68; and
    a viscosity at 190° C. and HLMI in a range from 3,000 to 7,500 Pa-sec.

8. A pipe or blow molded product comprising the polymer of claim 1.

9. The polymer of claim 1, wherein the polymer is further characterized by a HLMI, determined at 190° C. with a 21.6 kg weight, in a range from 4 to 14 g/10 min.

10. The polymer of claim 1, wherein the polymer contains, independently, less than 0.1 ppm by weight of chromium and titanium.

11. The polymer of claim 3, wherein the polymer is further characterized by:
   a viscous relaxation time, according to the Carreau-Yasuda empirical model, in a range from 0.5 to 3.5 sec;
   a CY-a parameter in a range from 0.48 to 0.68;
   a viscosity at 190° C. and HLMI in a range from 3,000 to 7,500 Pa-sec; or
   any combination thereof.

12. An article comprising the polymer of claim 11.

13. The polymer of claim 11, wherein:
   the density is in a range from 0.942 to 0.958 g/cm$^3$;
   the Mn is in a range from 6,000 to 12,000 g/mol;
   the ratio of Mw/Mn is in a range from 20 to 35; or
   any combination thereof.

14. A pipe or blow molded product comprising the polymer of claim 13.

15. The polymer of claim 11, wherein the polymer is further characterized by:
   a high load melt index (HLMI), determined at 190° C. with a 21.6 kg weight, in a range from 1 to 25 g/10 min.

16. The polymer of claim 11, wherein the polymer has:
   an IB parameter in a range from 1.8 to 2.3;
   a viscosity at 190° C. and 100 sec$^{-1}$ in a range from 2,200 to 2,800 Pa-sec;
   a ratio at 190° C. of η @ 0.1/η @ 100 in a range from 20 to 80; and
   a tan δ at 0.1 sec$^{-1}$ in a range from 2.2 to 3.9 degrees.

17. The polymer of claim 11, wherein the PENT value is at least 13,500 hr.

18. The polymer of claim 11, wherein:
   the density is in a range from 0.942 to 0.958 g/cm$^3$;
   the Mn is in a range from 6,000 to 12,000 g/mol; and
   the ratio of Mw/Mn is in a range from 20 to 35.

19. The polymer of claim 18, wherein the polymer has a higher molecular weight component (HMW) and a lower molecular weight (LMW) component, a Mp of the LMW component is in a range from 10,000 to 30,000 g/mol, and a Mp of the HMW component is in a range from 400,000 to 600,000 g/mol.

20. An ethylene polymer having:
   a density in a range from 0.94 to 0.96 g/cm$^3$;
   a Mn in a range from 5,000 to 14,000 g/mol;
   a ratio of Mw/Mn in a range from 18 to 40; and
   a PENT value at 80° C. and 2.4 MPa of at least 11,500 hr;
   wherein the polymer has a higher molecular weight component (HMW) and a lower molecular weight (LMW) component, and a ratio of a number of short chain branches per 1000 total carbon atoms at Mp of the HMW component to a number of short chain branches per 1000 total carbon atoms at Mp of the LMW component is in a range from 3.5 to 8.

21. An article comprising the polymer of claim 20.

22. The polymer of claim 20, wherein the polymer comprises an ethylene homopolymer, an ethylene/1-butene copolymer, an ethylene/1-hexene copolymer, and/or an ethylene/1-octene copolymer.

23. The polymer of claim 22, wherein:
   the PENT value is at least 13,500 hr; and
   the polymer is further characterized by:
      a high load melt index (HLMI), determined at 190° C. with a 21.6 kg weight, in a range from 1 to 25 g/10 min.

24. The polymer of claim 22, wherein:
   the density is in a range from 0.942 to 0.958 g/cm$^3$;
   the Mn is in a range from 6,000 to 12,000 g/mol; and
   the ratio of Mw/Mn is in a range from 20 to 35.

25. The polymer of claim 24, wherein the polymer is further characterized by:
   a viscous relaxation time, according to the Carreau-Yasuda empirical model, in a range from 0.5 to 3.5 sec;
   a CY-a parameter in a range from 0.48 to 0.68; and
   a viscosity at 190° C. and HLMI in a range from 3,000 to 7,500 Pa-sec.

26. A pipe or blow molded product comprising the polymer of claim 25.

27. The polymer of claim 22, wherein the polymer is further characterized by:
   a high load melt index (HLMI), determined at 190° C. with a 21.6 kg weight, in a range from 1 to 25 g/10 min;
   an IB parameter in a range from 1.8 to 2.3;
   a viscosity at 190° C. and 100 sec$^{-1}$ in a range from 2,200 to 2,800 Pa-sec;
   a ratio at 190° C. of η @ 0.1/η @ 100 in a range from 20 to 80; and
   a tan δ at 0.1 sec$^{-1}$ in a range from 2.2 to 3.9 degrees.

28. The polymer of claim 22, wherein the polymer contains, independently, less than 0.1 ppm by weight of chromium and titanium.

29. The polymer of claim 28, wherein the Mp of the LMW component is in a range from 10,000 to 30,000 g/mol, and the Mp of the HMW component is in a range from 400,000 to 600,000 g/mol.

30. An article comprising the polymer of claim 29.

* * * * *